US010739937B2

(12) United States Patent
Melencio

(10) Patent No.: US 10,739,937 B2
(45) Date of Patent: Aug. 11, 2020

(54) INTELLIGENT FUSION MIDDLEWARE FOR SPATIALLY-AWARE OR SPATIALLY-DEPENDENT HARDWARE DEVICES AND SYSTEMS

(71) Applicant: Abantech LLC, Springfield, VA (US)

(72) Inventor: Gregory Emmanuel Melencio, Springfield, VA (US)

(73) Assignee: Abantech LLC, Falls Church, VA (US)

( * ) Notice: Subject to any disclaimer, the term of this patent is extended or adjusted under 35 U.S.C. 154(b) by 82 days.

(21) Appl. No.: 16/010,222

(22) Filed: Jun. 15, 2018

(65) Prior Publication Data

US 2018/0364885 A1 Dec. 20, 2018

Related U.S. Application Data

(60) Provisional application No. 62/520,393, filed on Jun. 15, 2017.

(51) Int. Cl.
| | |
|---|---|
| *G06F 3/048* | (2013.01) |
| *G06F 3/0481* | (2013.01) |
| *G06F 3/01* | (2006.01) |
| *G06F 9/451* | (2018.01) |
| *G06F 3/16* | (2006.01) |
| *G06F 9/54* | (2006.01) |

(52) U.S. Cl.
CPC .......... *G06F 3/04815* (2013.01); *G06F 3/011* (2013.01); *G06F 3/015* (2013.01); *G06F 3/017* (2013.01); *G06F 3/167* (2013.01); *G06F 9/451* (2018.02); *G06F 9/546* (2013.01)

(58) Field of Classification Search
CPC ... G06F 3/00; G06F 3/01; G06F 3/011; G06F 3/015; G06F 3/017; G06F 3/16; G06F 3/167; G06F 9/54; G06F 9/546; G06F 9/451; G06F 3/048; G06F 3/0481; G06F 3/04815
See application file for complete search history.

(56) References Cited

U.S. PATENT DOCUMENTS 9,101,279 B2 * 8/2015 Ritchey .................. G16H 40/63
9,245,063 B2 * 1/2016 Zayic ...................... G06F 17/50
(Continued)

OTHER PUBLICATIONS

International Search Report and Written Opinion for International Application No. PCT/US2018/037909 dated Oct. 22, 2018.

*Primary Examiner* — Xiomara L Bautista
(74) *Attorney, Agent, or Firm* — Fish & Richardson P.C.

(57) ABSTRACT

Methods, including computer programs encoded on a computer storage medium, for controlling a 3D modeling application based on natural user input received at middleware. In one aspect, a method includes: receiving data indicating that an application operating at the application layer is interpreted as spatial data about one or entities at one or more corresponding locations within an environment context from one or more participating systems; receiving, through an interface in communication with the one or more systems that provide spatial data, multiple sets of spatial data provided by or derived from the one or more participating systems that are generated while the application manages one or more interactions in the environment context; determining adjustment to apply to the environment context.

20 Claims, 13 Drawing Sheets

(56) References Cited

U.S. PATENT DOCUMENTS

| | | | |
|---|---|---|---|
| 2011/0072367 A1* | 3/2011 | Bauer | G06F 3/04815 715/757 |
| 2011/0119640 A1* | 5/2011 | Berkes | G06F 3/011 715/863 |
| 2011/0154266 A1* | 6/2011 | Friend | A63F 13/06 715/863 |
| 2011/0169927 A1* | 7/2011 | Mages | G06F 3/04815 348/51 |
| 2014/0002444 A1* | 1/2014 | Bennett | G06F 3/012 345/419 |
| 2014/0359540 A1* | 12/2014 | Kelsey | G06F 3/017 715/863 |

* cited by examiner

600

```
┌─────────────────────────────────────────────────────────────┐
│ RECEIVE DATA INDICATING THAT AN APPLICATION IS RENDERING A  │
│                THREE-DIMENSIONAL WORKSPACE                  │
│                                                        602  │
└─────────────────────────────────────────────────────────────┘
                              │
                              ▼
┌─────────────────────────────────────────────────────────────┐
│             RECEIVE MULTIPLE NATURAL USER INPUTS            │
│                                                        604  │
└─────────────────────────────────────────────────────────────┘
                              │
                              ▼
┌─────────────────────────────────────────────────────────────┐
│    DETERMINE AN ADJUSTMENT TO APPLY TO THE THREE-           │
│                 DIMENSIONAL WORKSPACE                       │
│                                                        606  │
└─────────────────────────────────────────────────────────────┘
                              │
                              ▼
┌─────────────────────────────────────────────────────────────┐
│ BASED ON THE ADJUSTMENT, SELECTING A SET OF ONE OR MORE     │
│    FUNCTIONS THAT ARE EXECUTABLE BY THE APPLICATION         │
│                                                        608  │
└─────────────────────────────────────────────────────────────┘
                              │
                              ▼
┌─────────────────────────────────────────────────────────────┐
│  SEND DATA INSTRUCTING THE APPLICATION TO EXECUTE THE       │
│              SELECTED SET OF FUNCTIONS                      │
│                                                        610  │
└─────────────────────────────────────────────────────────────┘
```

FIG. 6

INTELLIGENT FUSION MIDDLEWARE FOR SPATIALLY-AWARE OR SPATIALLY-DEPENDENT HARDWARE DEVICES AND SYSTEMS

CROSS-REFERENCE TO RELATED APPLICATION

This application claims the benefit of U.S. Provisional Application No. 62/520,393 filed on Jun. 15, 2017, and titled "Intelligent Fusion Middleware for Spatially-Aware or Spatially-Dependent Hardware Devices and Systems," which is incorporated herein by reference.

TECHNICAL FIELD

This disclosure relates to Intelligent Fusion middleware for Spatially-aware or Spatially-dependent hardware devices and systems.

BACKGROUND

There has been identified a need for a fusion middleware that uses Artificial Intelligence to create a gestalt of the connected systems and devices. It is believed that a middleware is needed to provide a holistic platform to reduce the complexity of integrating disparate systems, allowing any device or combination of devices to be leveraged by and for any system, and in so doing greatly expanding the utility and usability of each. Such a middleware would allow the devices and software to be integrated in meaningful ways by using AI to dramatically increase the capabilities of the amalgamated system.

SUMMARY

Middleware leverages any combination of various existing third party systems to establish an operational context that interprets the data from participating spatially aware and spatially dependent systems to facilitate the interaction between the systems. The environment context comprises an in-memory representation in the spatially aware and spatially dependent devices of aggregated spatial data that controls tracked entities via gestures and controls action sources. An example of the environment context can be a three-dimensional workspace. In addition, the middleware may enhance user experience by invoking functions in the spatially aware modeling application that simulate real-time physical reactions to natural user input, such as gestures, speech, or brain activity, and augment the functionality of participating downstream systems by invoking combinations and/or series of its native functions.

In one aspect, the subject matter described in this specification may be embodied in methods that may include the actions of receiving, through an application interface in communication with an application layer running on a computing device, data indicating that an application operating at the application layer is interpreted as spatial data about one or entities at one or more corresponding locations within an environment context from one or more participating systems; receiving, through an interface in communication with the one or more systems that provide spatial data, multiple sets of spatial data provided by or derived from the one or more participating systems that are generated while the application manages one or more interactions in the environment context; determining, based at least on the multiple sets of spatial data provided by or derived from the one or more participating systems and the one or more entities at the one or more corresponding locations, an adjustment to apply to the environment context; based on the adjustment, selecting, from among multiple functions (i) that are executable by the application and (ii) that each, when executed by the application, apply a respective adjustment to the environment context, a set of one or more of the multiple functions; and sending, through the application interface in communication with the application layer running on the computing device, messages comprising data and instructions to the one or more participating systems to execute the set of one or more of the multiple functions.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

These other versions may each optionally include one or more of the following features. For instance, receiving, through the hardware interface in communication with the natural user interface device, multiple natural user inputs that are generated while the application is rendering the environment context to the user may, in some examples, include receiving, through the hardware interface in communication with the natural user interface device, multiple natural user inputs that are generated while the application is rendering the environment context to the user and that are descriptive of movements made by the user within an environment of the user.

In some examples, the actions may further include receiving, through the interface in communication with the one or more systems that provide spatial data, the multiple sets of spatial data provided by or derived from the one or more participating systems that are generated while the application manages the one or more interactions in the environment context further includes: receiving, through the interface in communication with the spatial data provider, multiple sets of spatial data provided by or derived from the one or more participating systems that are generated while the application manages the one or more interactions in the environment context and that are descriptive of movements made by a user within the environment of the user.

In some implementations, the actions may further include determining that the multiple sets of spatial data provided by or derived from the one or more participating systems that (i) corresponds to a particular set of one or more actions and (ii) involves a state change of the one or more entities within the environment context assembled from spatial data provided by or derived from the participating systems corresponds to a particular set of one or more entities at one or more of corresponding locations; and based on the adjustment, selecting, from among multiple functions (i) that are executable by the application and (ii) that each, when executed by the application, apply a respective adjustment to the environment context, the set of one or more of the multiple functions includes selecting, from among multiple functions (i) that are executable by the application and (ii) that each, when executed by the application, apply a respective adjustment to the environment context, a set of one or more of the multiple functions that, when executed by the application, apply the particular set of one or more actions to the particular set of one or more entities that are determined based on the spatial data derived from the environment context.

In some implementations, the actions may further include accessing a set of rules that control behavior of the environment context; evaluating the multiple sets of spatial data provided by or derived from the one or more participating systems and the one or more locations within the environment context at which one or more corresponding entities and actions are interpreted or evaluated against the set of rules; wherein determining, based at least on the multiple sets of spatial data provided by or derived from the one or more participating systems and the one or more entities at the one or more corresponding locations, the adjustment to apply to the environment context comprises: determining, based at least on evaluating the multiple sets of spatial data provided by or derived from the one or more participating systems and the one or more locations within the environment context at which one or more corresponding entities are interpreted or evaluated against the set of rules, an adjustment to apply to the environment context; and providing the adjustment to apply to the environment context to subsequent applications selected to receive the adjustment.

In some implementations, the actions may further include accessing the set of rules comprises accessing a set of rules that define the construction or augmentation the environment context with one or more sensors.

In some implementations, the actions may further include accessing the set of rules comprises accessing a set of rules that are stored and maintained independent of the application.

In some implementations, the actions may further include accessing the set of rules comprises accessing a set of rules that construct or augment the environment context derived from spatial data provided by or derived from the one or more participating systems about an operational environment.

In some implementations, the actions may further include wherein determining, based at least on evaluating the multiple sets of spatial data provided by or derived from the one or more participating systems and the one or more locations within the environment context at which one or more corresponding entities are interpreted against the set of rules, the adjustment to apply to the environment context includes determining, based at least on evaluating the multiple sets of spatial data provided by or derived from the one or more participating systems and the one or more locations within the environment context at which one or more corresponding entities are interpreted against the set of rules, an adjustment to apply to the environment context that complies with the one or more spatial physics systems.

In some implementations, the actions may further include wherein receiving, through the interface in communication with the natural user interface device, multiple sets of spatial data includes receiving, through the interface in communication with a spatial data provider that is separate from the computing device, multiple sets of spatial data provided by or derived from the one or more participating systems.

In some implementations, the actions may further include wherein receiving, through an interface in communication with a spatial data provider, multiple sets of spatial data provided by or derived from the one or more participating systems that are generated while the application manages one or more interactions in the environment context includes receiving, through an interface in communication with a spatial data provider, audio data that is generated while the application manages the one or more interactions in the environment context to the user and encodes one or more utterances spoken by the user.

In some implementations, the actions may further include wherein receiving, through the interface in communication with the spatial data provider, multiple inputs from the one or more participating systems that are generated while the application manages one or more interactions in the environment context to the user includes receiving, through an interface in communication with a spatial data provider, electroencephalographic data that is generated while the application is interpreting the environment context to the user and indicates electrophysiological activity of the user.

In some implementations, the actions may further include wherein receiving, through the interface in communication with the natural user interface device, multiple inputs from the one or more participating systems that are generated while the application manages one or more interactions in the environment context to the user includes receiving, through the interface in communication with a spatial data provider that monitors an environment of the user, multiple inputs that are generated (i) while the application is interpreting the environment context to the user and (ii) based on one or more characteristics of the environment of the user.

In some implementations, the actions may further include receiving data indicating other inputs (i) while the application is interpreting the environment context to the user and (ii) based on one or more characteristics of another, different environment of one or more other users; and wherein determining, based at least on the multiple sets of spatial data provided by or derived from the one or more participating systems and the one or more locations within the environment context at which one or more corresponding entities are rendered, the adjustment to apply to the environment context includes determining, based at least on (i) the multiple sets of spatial data, (ii) the data indicating other inputs, and (iii) the one or more locations within the environment context at which one or more corresponding entities are interpreted, the adjustment to apply to the environment context.

In some implementations, the actions may further include the environment context includes one or more other physical environments in an operational context constructed from the spatial data from the one or more participating systems.

The details of one or more exemplary implementations are set forth in the accompanying drawings and description, below. Other potential features and advantages of the disclosure will be apparent from the description and drawings, and from the claims.

BRIEF DESCRIPTION OF THE DRAWINGS

FIG. 6 is a flowchart of an exemplary process.

DETAILED DESCRIPTION

This application describes systems and methods for controlling a 3D modeling application based on natural user input received at middleware. In one general aspect, the middleware described herein may act as a retrofit to an existing system running 3D modeling software that enables a user to control (e.g., create, transform, modify, delete, etc.) assets or entities within a 3D workspace (e.g., planes and shapes such as cubes, spheres, etc.) with natural user input (e.g., hand movements, head movements, limb movements, facial expressions, finger positions, eye movements, relative finger movements, voice, speech, electrophysiological activity, etc.). The middleware described herein is a versatile component in that it can be utilized as an add-on to many different third-party spatially aware and spatially-dependent applications, such as 3D modeling applications, as one exemplary implementation, and may detect user gestures from input provided by any of a variety of sensors and natural user interface devices ("NUI").

In addition, the middleware may enhance user experience by invoking functions in the 3D modeling application that simulate real-time physical reactions to the user's gestures. In addition, the middleware may invoke functions in the 3D modeling application that simulate real-time physical reactions to data obtained by agnostic devices, other than user's gestures. For example, the data obtained by sensors, such as speed and altitude of a drone, may invoke a speed and height movement illustrated by a 3D drone modeled in the 3D modeling application. In another example, the data obtained by GPS sensors indicating movement of a vehicle, may invoke a speed and direction movement illustrated by a 3D vehicle modeled in the 3D modeling application. Other examples are possible; the two aforementioned examples are provided only to illustrate the functionality. In this way, the middleware may augment a workspace being rendered by the 3D modeling application with physics systems and other constraints by selectively instructing the 3D modeling application to invoke combinations and/or series of its native functions. The middleware also allows for easy 3D modeling application user customization.

Figure 1A:
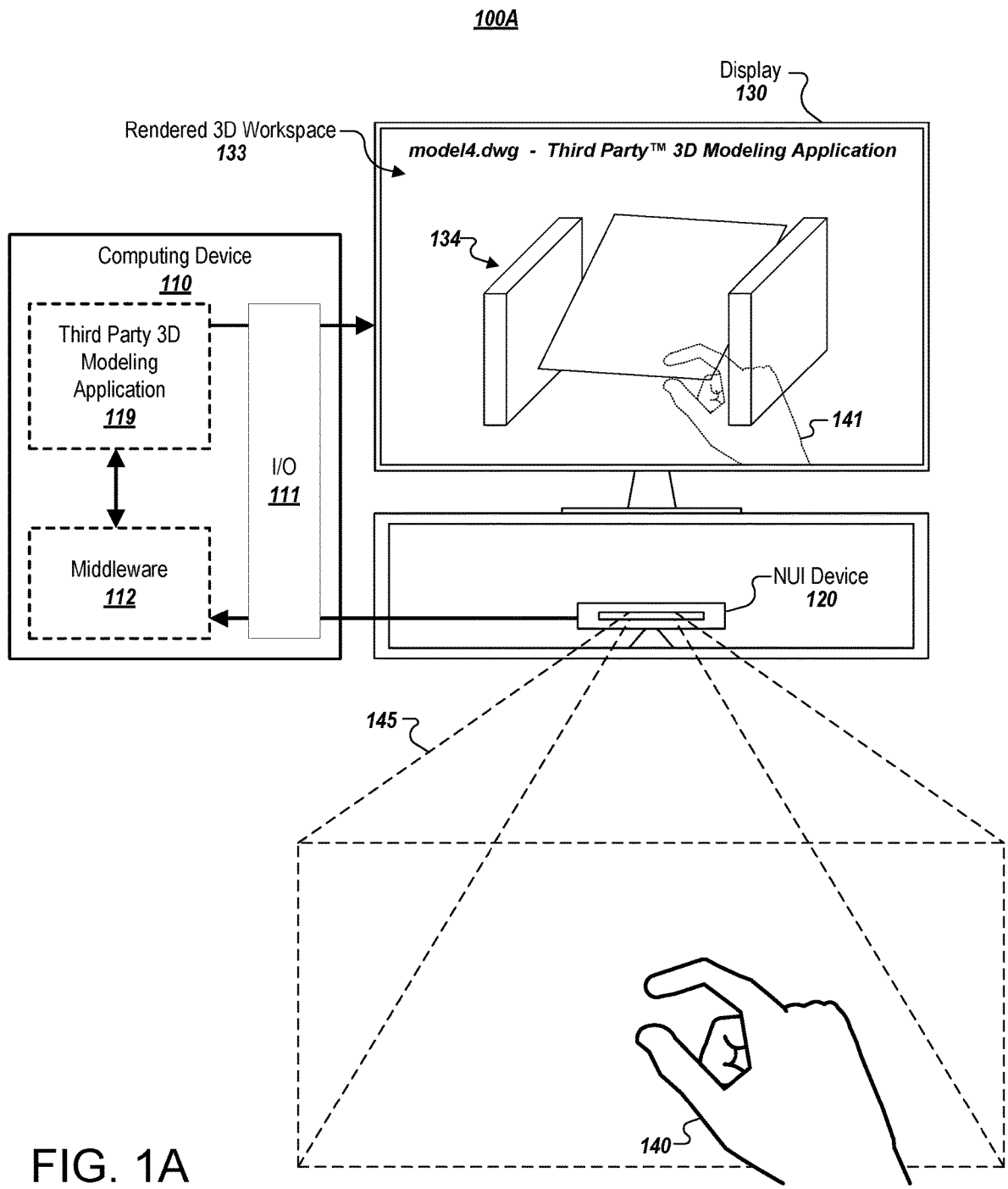
FIGS. 1A-C, 2, 7, and 8 are diagrams of exemplary systems.

FIG. 1A illustrates an exemplary immersive 3D modeling system 100A for controlling a 3D modeling application based on natural user input received at middleware. The system 100A includes a computing device 110, a natural user interface ("NUI") device 120, and a display 130. The computing device 110 may, for example, be a mobile device, laptop computer, desktop computer, set-top box, smart television, heads-up display system, optical head-mounted display system, and the like. The computing device 110 may communicate with NUI device 120 and display 130 through an interface 111. In addition, middleware 112 and third party 3D modeling application 119 may run on computing device 110.

The third party 3D modeling application 119 running on computing device 110 may, for instance, include an application that is used for developing mathematical representations of three-dimensional entities (e.g., AutoCAD, SketchUp, OnShape, TinkerCAD, MakerWare, etc.). In operation, the third-party 3D modeling application 119 may provide an environment context within which entities may be developed, modified, and rendered for output on display 130. In this example, a rendered 3D workspace 133 of third party 3D modeling application 119 is output for presentation on display 130. In other cases, the system can be used to control robotic apparatuses on unmanned semi-autonomous vehicles.

Figure 1B:
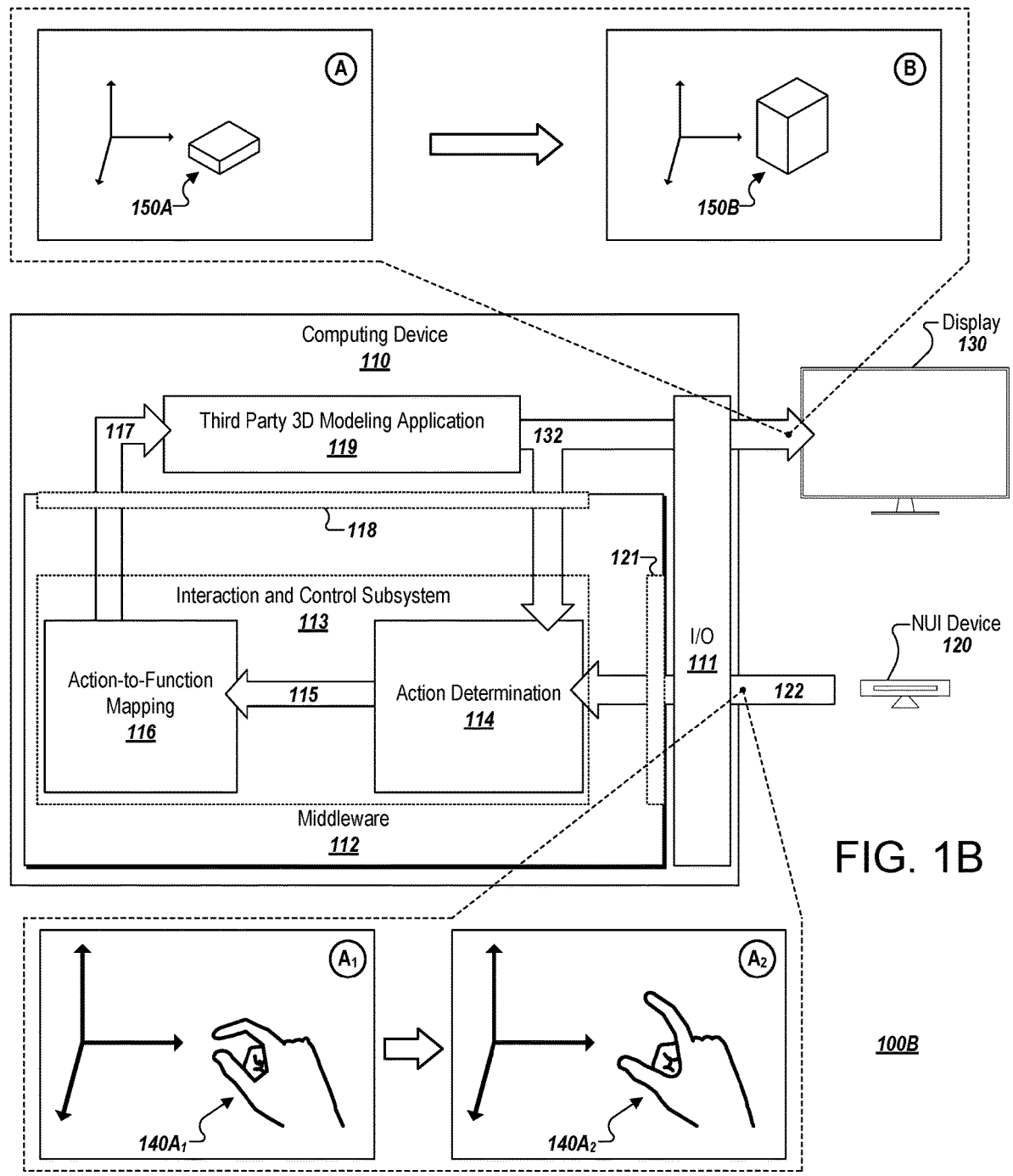

The NUI device 120 may, for instance, include one or more sensing devices that detect and capture natural user input (e.g., Microsoft Kinect, Leap Motion Controller, Google Soli radar, Xtion, Emotiv, RealSense, etc.). In operation, the NUI device 120 may sense one or more natural user inputs of a user 140 within an environment 145, and output data representative of such natural user inputs to computing device 110. The NUI device 120 may sense light, sound, electrical activity, temperature, chemical presence, vibration, pressure, acceleration, radio frequency signals, pressure, position, geographic location, or a combination thereof. In some examples, the third party 3D modeling application 119 may not natively possess the capabilities to receive and process natural user input provided by one or more devices such as NUI device 120. Although the NUI device 120 is depicted in FIGS. 1A-B as being a single device that is collocated with the computing device 120, it is to be understood that the NUI device 120 may take the form of one or more natural user interface devices, some or all of which may be remotely located from the computing device 120.

The middleware 112 may, for instance, include one or more software components running on the computing device 110 external from the third party 3D modeling application 119. In some implementations, the middleware 112 may provide output to the third party 3D modeling application 119 based at least in part on input the middleware 112 receives from the NUI device 120 and the third party 3D modeling application 119. The output that the middleware 112 provides to the third party 3D modeling application 119 may include data instructing the third party 3D modeling application 119 to invoke combinations and/or series of its native functions. That is, the middleware 112 may cause the third party 3D modeling application 119 to make one or more adjustments to the 3D workspace that it maintains.

In some examples, the middleware 112 may leverage these capabilities in order to allow user 140 to control one or more functions of the third party 3D modeling application 119 with one or more natural user inputs provided by the user 140 within the environment 145 monitored by NUI device 120. It can be seen that, in the example of FIG. 1A, the middleware 112 may enable user 140 to interact with one or more entities 134 within the 3D workspace maintained by the third party 3D modeling application 119.

The middleware 112 may also, for instance, impose one or more rules and constraints upon the 3D workspace maintained by the third party 3D modeling application 119. In this way, the middleware 112 may be able to completely transform the user experience provided by the third party 3D modeling application 119 into one of its own specifications. It can be seen that, in the example of FIG. 1A, the middleware 112 may instruct the third party 3D modeling application to render a representation 141 of the hand of user 140 as monitored by NUI device 120. In this example, the middleware 112 one or more rules and constraints so as to augment the 3D workspace maintained by the third party 3D modeling application 119 with representation 141, which may be treated within the 3D workspace as a user interface tool akin to a cursor. From the perspective of the third party 3D modeling application 119, the representation 141 may be nothing more than a collection of entities within the 3D workspace that it maintains. It is the middleware 112, rather, that gives representation 141 these properties by instructing the third party 3D modeling application 119 to invoke intricate combinations and/or series of its native functions that the middleware 112 determines based on one or more rules and constraints.

FIG. 1B illustrates an exemplary immersive 3D modeling system 100B for controlling a 3D modeling application based on natural user input received at middleware 112. System 100B may, for instance, be similar the system 100A as described above in reference to FIG. 1A. As shown in FIG. 1B, middleware 112 may include an interaction and control subsystem 113 that receives natural user input 122 from NUI device 120 and 3D workspace information 132 from the third party 3D modeling application 119. In particular, the middleware 112 may further include a hardware interface 121 and an application interface 118, through which the middleware 112 may receive natural user input 122 and 3D workspace information 132, respectively. In some examples, the natural user input 122 may be received over one or more networks, through Web Sockets, and the like, to enable multi-user collaboration. The interaction and control subsystem 113 may further provide instructions 117 to the third party 3D modeling application 119 by way of the application interface 118 in order to invoke combinations and/or series of functions that are native to the third party 3D modeling application 119.

In one general aspect, the interaction and control subsystem 113 may serve to perform action determination (114). The interaction and control subsystem 113 may include one or more modules, which are described in further detail below in reference to FIGS. 3A-C, that perform processes involved in making such a determination. More particularly, the interaction and control subsystem 113 may determine one or more actions that are to be performed within the 3D workspace maintained by the third party 3D modeling application 119. Such determinations may be made by the interaction and control subsystem 113 on the basis of natural user input 122 provided and 3D workspace information 132. In addition, the interaction and control subsystem 113 may take one or more rules and constraints into account when performing action determination. The middleware 112 may obtain 3D workspace information 132 in order to determine the state of the 3D workspace maintained by the third party 3D modeling application 119. In this way, the middleware 112 may be able to determine which one or more entities with which a user may be trying to interact. The 3D workspace information 132 may additionally serve as feedback for the interaction and control subsystem 113, so as to allow middleware 112 to evaluate the effectiveness of instructions 117 that have been provided to the third party 3D modeling application 119. In some examples, the interaction and control subsystem 113 may perform one or more adaptive processes based on such feedback so as to minimize error.

Once the interaction and control subsystem 113 has determined an action 115 that is to be performed within the 3D workspace maintained by the third party 3D modeling application, it may proceed to map the determined action 115 to a particular set of one or more functions which, when executed by the third party 3D modeling application, apply the determined action 115 to the 3D workspace maintained by the third party 3D modeling application (116). The interaction and control subsystem 113 may include one or more modules, which are described in further detail below in reference to FIGS. 3A-C, that perform processes involved in making such a determination. The middleware 112 may have access to one or more sets of data that indicate the particular functions and commands that are native to the third party 3D modeling application 119.

FIG. 1B further illustrates exemplary representations of 3D workspace information 132 and natural user input 122 at different time-sequenced stages "A" to "B," respectively. In the example of FIG. 1B, it can be seen that a 3D workspace maintained by the third party 3D modeling application 119 may, at stage include an object 150A. The natural user input 122 provided to middleware 112 may show a user's hand in a first state $140A_1$ at stage $A_1$, and then in a second state $140A_2$ at stage $A_2$. The interaction and control subsystem 113 may receive these natural user inputs 122 and 3D workspace information 132, and subsequently determine that the user has performed a gesture that corresponds to an action of extruding object 150A along a vertical axis. For example, the interaction and control subsystem 113 may make this determination by comparing the position of the user's hand in three-dimensional space to the 3D workspace maintained by the third party 3D modeling application 119.

Upon determining an action to be performed within the 3D workspace, the interaction and control subsystem 113 may proceed to map the determined extrusion action to a particular set of one or more functions which, when executed by the third party 3D modeling application 119, apply the desired extrusion to object 150A. The middleware 112 may then provide data instructing the third party 3D modeling application to perform the determined functions through the application interface 118. Then, at stage B, the third party 3D modeling application 119 may apply the desired extrusion to object 150A and update the 3D workspace it maintains to reflect an extruded object 150B.

Figure 1C:
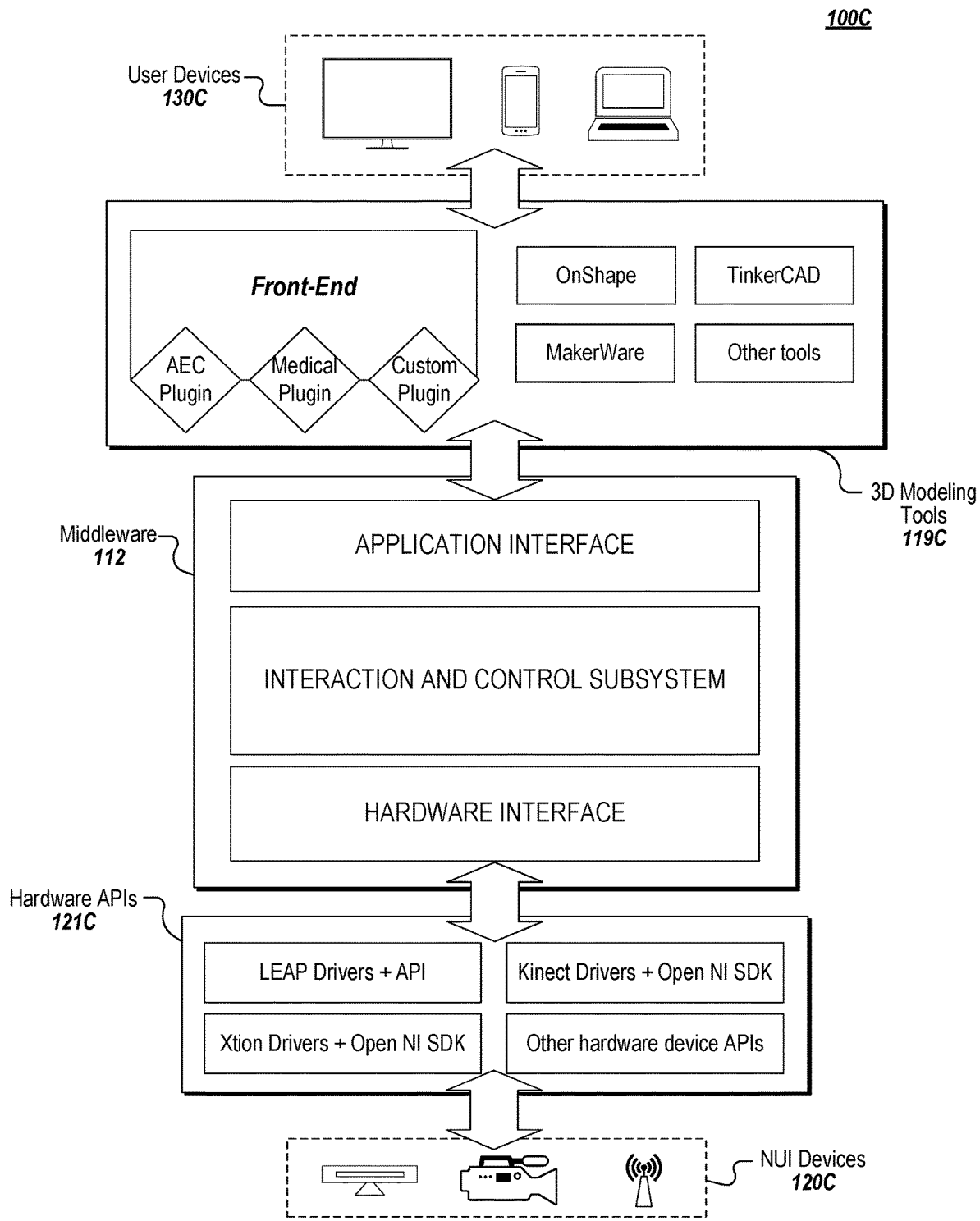

FIG. 1C illustrates an exemplary immersive 3D modeling system 100C for controlling a 3D modeling application based on natural user input received at middleware 112. System 100C may, for instance, be similar the systems 100A-B as described above in reference to FIGS. 1A-B. As mentioned above, the middleware 112 may include an interaction and control subsystem that performs the translation between hardware devices for NUI functions, a constraint-system (e.g., processes to dictate system behavior), and functional mapping between the commands passed through the constraint system and the consuming front-ends. At a high-level, middleware 112 is a set of components intended to manage the control and interaction between the end-user input, as provided by the hardware application programming interfaces ("APIs") 121C, and the receiving (downstream) systems. For example, the receiving (downstream) systems can include the external 3D modeling tools 119C. The front-end may interface with one or more user devices 130C, which may include input/output devices such as display 130, as well as other computing devices such as mobile phones and laptops. The hardware APIs 121C may interface with one or more NUI devices 120C, which may include devices such as NUI device 120, as well as other natural user interface devices and sensors such as Microsoft Kinect, Leap Motion Controller, and Xtion. Additionally, the hardware APIs 121C may interface with one or more spatial data provider systems, which may include software provided GIS systems, for example. The hardware abstraction layer 312 may include and/or may work in tandem with a spatial data abstraction layer 334. The spatial data abstraction layer 334 translates data from the one or more spatial provider systems to provide to the interaction and control subsystem 322.

Within the receiving (downstream) systems, such as the consuming 3D software, for example, middleware 112 defines the interaction between the assets or entities within the system and processes context-aware instructions. The middleware 112 may interact with a front-end including a lightweight/browser-based 3D design and rendering tool that allows for collaboration and customization and specialization for industries (e.g., AEC, Medical, etc.). The front-end may be built on an open and extensible architecture that allows for plugins to customize multiple different aspects of the user interface. In addition, the front-end includes built-in multi-user collaboration facilities to allow users to work side-by-side.

In one aspect, each device included in systems 100A-C may be implemented using, for example, one or more general-purpose computers capable of responding to and executing instructions in a defined manner, personal computers, special-purpose computers, workstations, servers, or mobile devices. In addition, the computing device 110, NUI devices 120C, and user devices 130C, may communicate over one or more networks to exchange data with one another and/or other computing devices. Such networks may, in some examples, include one or more networks such as a local area network, a wide area network, and/or the Internet. One or more of the networks may be wireless, such as a cellular telephone network or a Wi-Fi network. In addition, the computing device 110, NUI devices 120C, and user devices 130C, and/or other devices and systems described in association with systems 100A-C may rely upon one or more remotely-located devices such as servers, databases, and/or cloud computing devices to perform at least a portion of their respective functions as described herein. In this way, systems 100A-C may enable multiple remotely-located users to collaborate on modeling projects, participate in multiplayer games, and the like.

Figure 2:
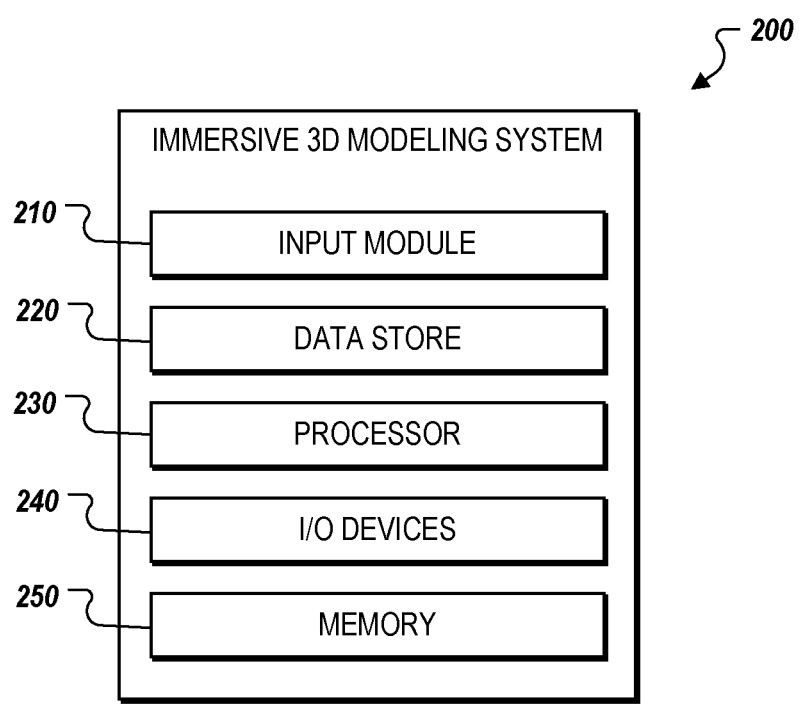

FIG. 2 illustrates an exemplary immersive 3D modeling system 200 for controlling a 3D modeling application based on natural user input received at middleware. The system 200 includes an input module 210, a data store 220, one or more processors 230, one or more I/O (Input/Output) devices 240, and memory 250. Each of the components 210, 220, 230, 240, and 250 may be interconnected using a system bus or otherwise communicatively coupled one another. The input module 220 may be used to input any type of information accepted by an immersive 3D modeling process leveraged by the system 200. For example, the input module 210 may be used to receive, for example, data obtained and maintained by the middleware's hardware abstraction layer, interaction and control subsystem, and application interface. In some implementations, data from the input module 210 is stored in the data store 220. The data included in the data store 220 may include, for example, data obtained and maintained by the middleware's hardware abstraction layer, interaction and control subsystem, and application interface, and all other data described above in reference to FIGS. 1A-C and 3A-6.

In some examples, the data store 220 may be a relational database that logically organizes data into a series of database tables. Each database table in the data store 220 may arrange data in a series of columns (where each column represents an attribute of the data stored in the database) and rows (where each row represents attribute values). In some implementations, the data store 220 may be an object-oriented database that logically or physically organizes data into a series of entities. Each object may be associated with a series of attribute values. In some examples, the data store 220 may be a type of database management system that is not necessarily a relational or object-oriented database. For example, a series of XML (Extensible Mark-up Language) files or documents may be used, where each XML file or document includes attributes and attribute values. Data included in the data store 220 may be identified by a unique identifier such that data related to a particular process may be retrieved from the data store 220.

The processor 230 may be a processor suitable for the execution of a computer program such as a general or special purpose microprocessor, and any one or more processors of any kind of digital computer. In some implementations, the system 200 includes more than one processor 230. The processor 230 may receive instructions and data from the memory 250. The memory 250 may store instructions and data corresponding to any or all of the components of the system 200. The memory 250 may include read-only memory, random-access memory, or both.

The I/O devices 240 are configured to provide input to and output from the system 200. For example, the I/O devices 240 may include a mouse, a keyboard, a stylus, or any other device that allows the input of data. The I/O devices 240 may also include a display, a printer, or any other device that outputs data.

Figure 3A:
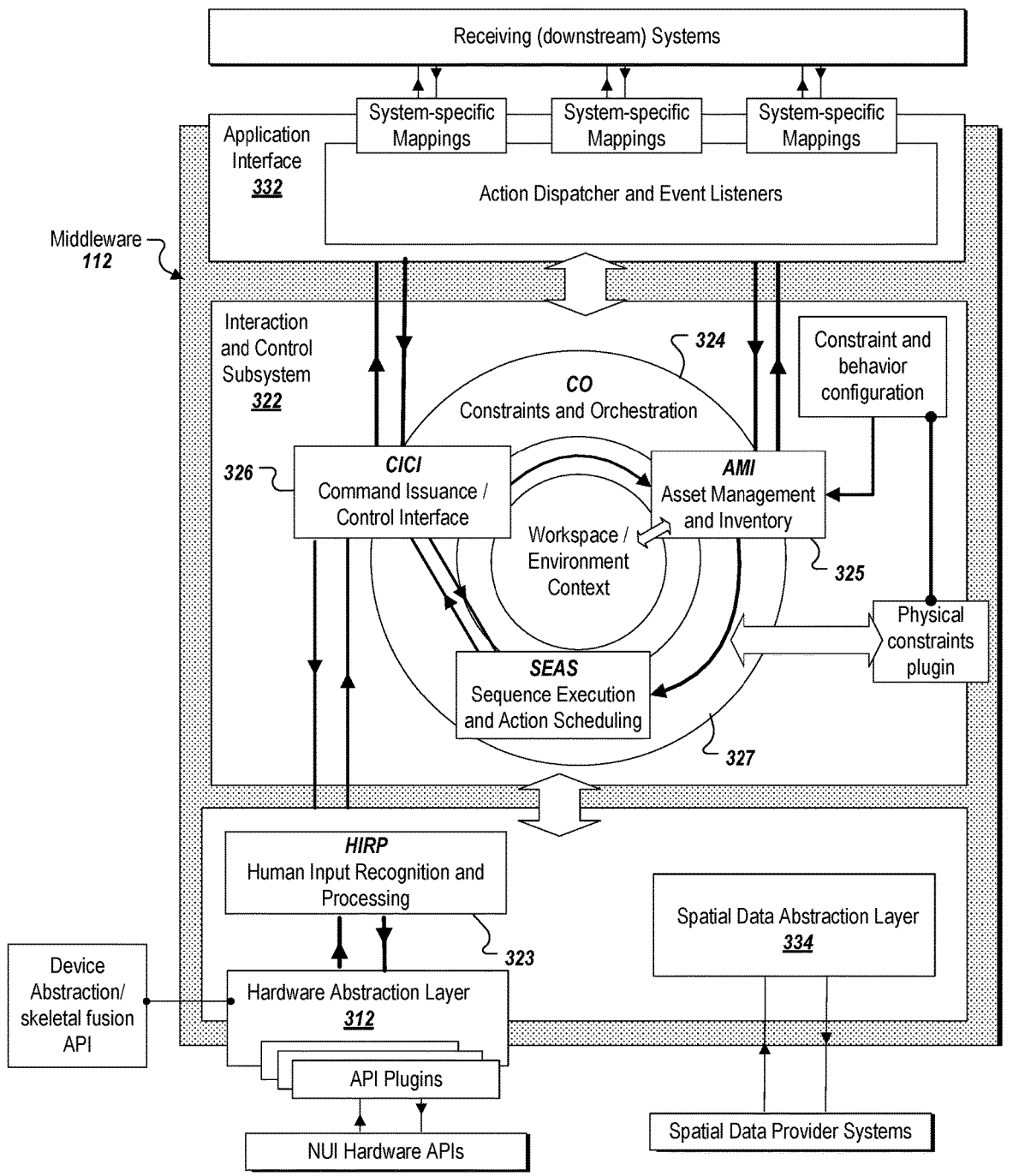
FIGS. 3A, 3B, and 3C are conceptual diagrams of an exemplary framework for controlling a spatially aware application based on natural user input received at middleware 112 in respective systems.
Figure 3B:
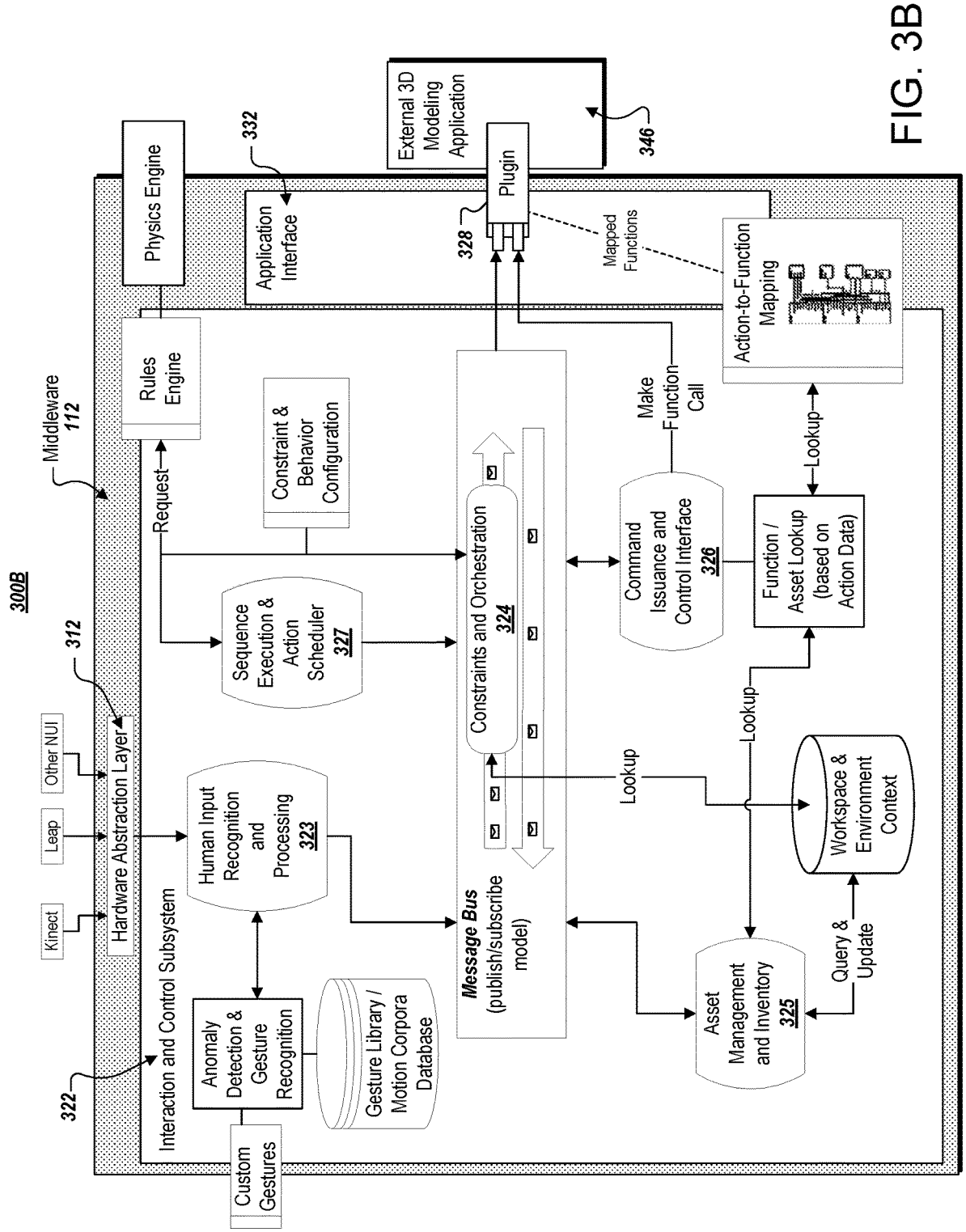
Figure 3C:
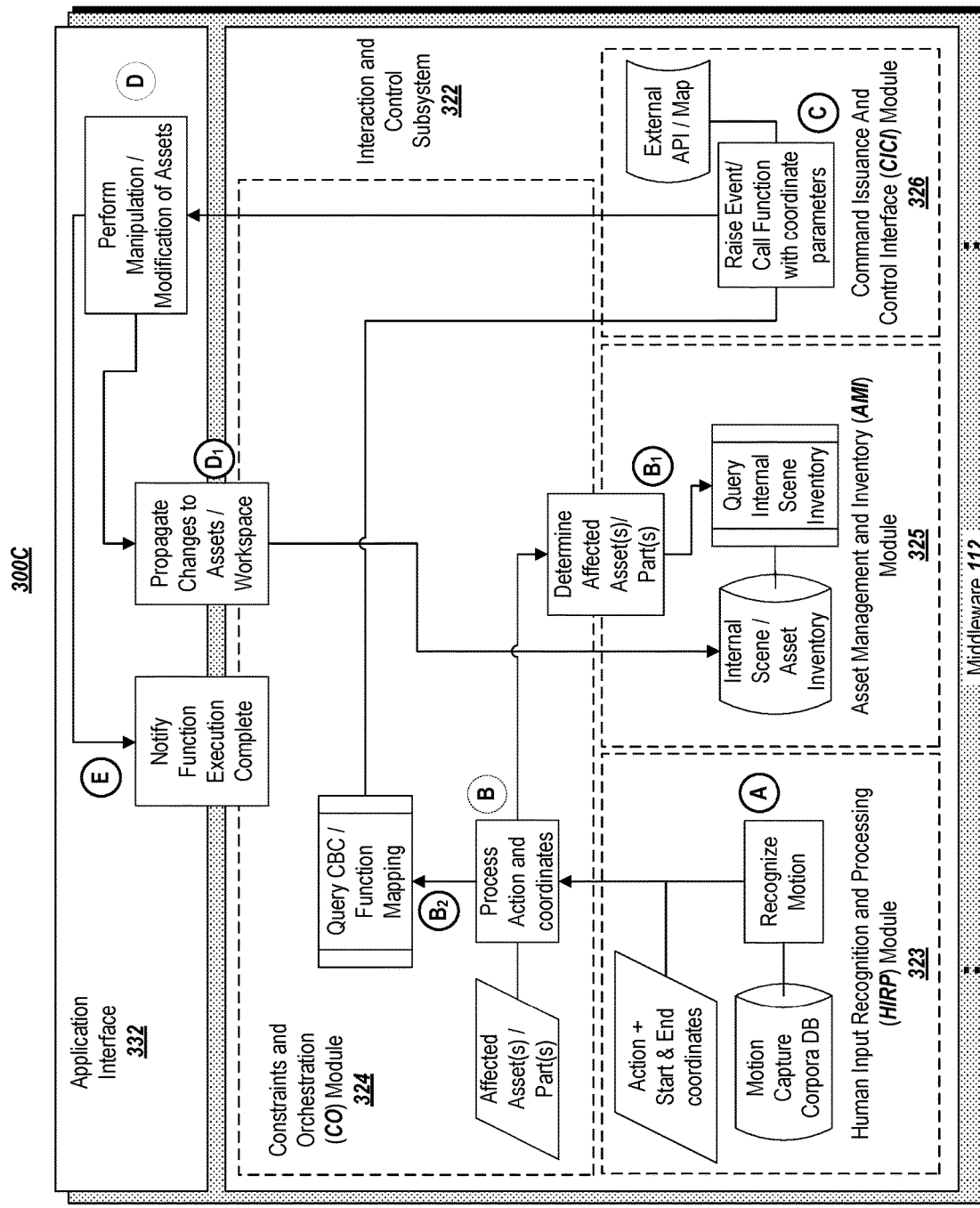

FIGS. 3A, 3B, and 3C illustrate conceptual diagrams of an exemplary framework for controlling a spatially aware application based on gesture input received at middleware 112 in systems 300A, 300B, and 300C, respectively. More particularly, the middleware 112 of systems 300A-C includes a hardware abstraction layer 312, an interaction and control subsystem 322, and an application interface 332.

The hardware abstraction layer 312 may serve as a hardware interface, as described above, between middleware 112 and various sensors (e.g., Microsoft Kinect, Leap Motion Controller, Google Soli radar, Xtion, Emotiv, RealSense, etc.) that may be used to detect and output data indicating user, environmental input, sensory input, and data describing characteristics of particular devices. In some examples, the hardware abstraction layer 312 may condition such sensor input in a manner that allows for the input to be processed for recognized movements or gestures. In addition, the hardware abstraction layer 312 may allow for input data to be processed for sensory devices, such as GPS devices, altimeters, and satellites, to name a few examples. The hardware abstraction layer 312 may also, for instance, enable tracking of the user's skeletal structure by middleware 112. As an abstraction layer, it also allows the use of multiple devices to be used concurrently and in coordination with each other. The interaction and control subsystem 322 may manage the actions performed as responses a combination of (i) end-user input received (through the Hardware APIs) and (ii) applying behaviors to the assets with the 3D modeling application. The application interface 332 may include (i) a messaging system that allows for two-way communication between the interaction and control subsystem 322 and (ii) system-specific mappings (also referred to as 'Adapters') that perform the mapping and translation between the messages sent to and from the 3D modeling and visualization software.

The interaction and control subsystem 322 may include several modules that define behaviors with respect to the context under which the user of the spatially aware application is working. In some examples, the spatially aware application can include a 3D modeling application and/or a virtual reality application, to name a few examples. To do so, the interaction and control subsystem 322 maintains one or more internal representations of the workspace and 3D environment that the modeling application is providing and rendering to a user. This internal representation, which the interaction and control subsystem 322 may obtain and/or generate from data received from the application interface 332, may provide context to the user input that is provided to the interaction and control subsystem 322 by the hardware abstraction layer 312. In this way, the interaction and control subsystem 322 can be seen as bridging the gap between NUI hardware and 3D modeling applications, for example. In addition, the modules of the interaction and control subsystem 322 serve to add functionality to 3D modeling applications and enhance user experience.

The modules of the interaction and control subsystem 322 may at least include an exemplary plugin, such as a human input recognition and processing ("HIRP") module 323, a constraints and orchestration ("CO") module 324, an asset management and inventory ("AMI") module 325, a command issuance and control interface ("CICI") module 326, and a sequence execution and action scheduler ("SEAS") module 327. FIG. 3B depicts an exemplary use case of the relationship between each of these modules and their respective roles in communicating with an external 3D modeling application 346 that is running a 3D modeling application. Alternatively, each of these modules and their respective roles may communicate with an external 3D modeling application 346 that is running an environment context application, other than a 3D modeling application. Each module of the interaction and control subsystem 322 may be connected with a message bus according to a publish/subscribe or other message/relaying paradigm. The interaction and control subsystem 322 may, for instance, publish asset changes to a plugin 328 interacting with external 3D modeling application 346 and subscribe to user notifications. The configuration of plugin 328 may, for instance, depend on the type of application with which it is interfacing, whether the type of application be a 3D modeling application or an environment context application. In some implementations, the plugin may be tailored to the 3D modeling application or the environment context application for which middleware 112 is an add-on, with the configuration remaining components of middleware 112 being substantially consistent across many different applications.

The human recognition and processing module 323 can be seen as a set of algorithms that define and translate the motions received from the hardware abstraction layer 312 into contextually aware sequences. The instructions prepared by the human input recognition and processing module 323 may be provided as input to the command control interface module 326. In some examples, parameters corresponding to these instructions are also determined by the human recognition and processing module 323 and provided to the command control interface module 326 along with the instructions. In some implementations, the human recognition and processing module 323 translates the motions received into a particular format, such as that which conforms to Biovision hierarchy ("BVH"). The human recognition and processing module 323 may publish data such as actions, recognized gestures, raw positional data, and local/relative data.

In addition, the data provided by the human recognition and processing module 323 can be converted to messages before being provided to the constraints and orchestration module 324. In particular, the human recognition and processing module 323 organizes the data in a message format to facilitate the constraints and orchestration module 324 to process each incoming message from the various devices and/or gestures in an efficient format. For example, the human recognition and processing module 323 may convert the data into a message structure similar to that of Transmission Control Protocol/Internet Protocol (TCP/IP), with datagrams and acknowledgement numbers, etc. In another example, the human recognition and processing module 323 may convert the data into a message structure similar to that of a packet structure system that defines a packet length, a data length, an acknowledgement number, and a type of cyclic redundancy check, to name a few examples. The human recognition and processing module 323 posts the message onto a message bus for other modules to retrieve the message. In other implementations, the constraints and orchestration module 324 can also process incoming messages from components and modules other than the human recognition and processing module 323.

The constraints and orchestration module 324 can be seen as a set of algorithms that define behaviors with respect to context and as configured, receive the messages provided by the human recognition and processing module 323. That is, the constraints and orchestration module 324 acts to specify the types of events/actions are capable of occurring within the 3D workspace based on the assets of the 3D workspace and/or the commands that are made available to the user by the 3D modeling application based on the received messages. In addition, the constraints and orchestration module 324 may serve to prevent messages from flowing down the command issuance and control interface module 326 and causes triggering of the sequence execution and action scheduling module 327 based on the awareness of the environment and how the behavior of the 3D workspace itself works based on the rulesets defined. Alternatively, the constraints and orchestration module 324 may provide the received messages to be routed down the command issuance and control interface module 325 based on the awareness of the environment and how the 3D workspace itself works based on the rulesets defined. The rulesets may allow the messages to be routed based on a context of the behavior. For example, some rulesets may not allow message types to be transmitted based on the applications listening on the message bus. In another example, some rulesets may allow message types to be transmitted based on the behavior of a current environment context. Once removed off the message bus, the data contents in the message may be combined with other data in each of the modules for processing in the downstream applications. Subsequently, downstream applications that are subscribed to particular channels on the message bus, such as the action dispatcher and event listeners in application interface 332, may retrieve a copy of that message off the message bus. Each of the downstream applications can convert the data contents in that downstream application to become a function call for the downstream system(s). The conversion from data contents in the message to a function call for the downstream application may be performed by an action-to-function mapping with the middleware 112. Essentially, the middleware 112 retrieves relevant payload information from the message to create API function calls in the downstream systems' API. The middleware 112 creates the API function calls based on the downstream systems' API and fills the parameters for those function calls using the data contents in the message. Exemplary rulesets are described in more detail below.

The asset management and inventory module 325 may provide internal controls and data structures that allow coordination between the constraints and orchestration module 324 in response to actions dispatched by the command issuance and controls interface 326, and provide corresponding notifications to the sequence execution and action scheduling module 327. The data structures provided by asset management and inventory module 325 may map to that of the internal workspace/context. The asset management and inventory module 325 may subscribe to asset changes and publish desired asset states.

The command issuance and controls interface module 326 may receive and process input actions and requests from both the human input recognition and processing module 323 and the sequence execution and action scheduling module 327. In addition, the command issuance and controls interface module 326 processes the instructions that are to be passed through the constraints and orchestration module 324 and dispatched to an external 3D modeling application 346.

The command issuance and controls interface modules 326 may subscribe to system instructions and actions.

The sequence execution and action scheduling module 327 may queue up commands that are to be executed subsequently from a previous command or in response to changes within the context. The sequence execution and action scheduling modules 327 may publish system instructions (e.g., macroed events). In this way, the sequence execution and action scheduling module 327 may be seen as enabling a "multiple consumer" configuration in which consuming application functions are executed in a linear manner. In other implementations, the sequence execution and action scheduling module 327 can execute the consuming application functions in multiple threads or in a branching sequence manner. For example, the sequence execution and action scheduling module 327 may execute multiple threads in parallel so as to execute the consuming application functions in a more efficient manner.

FIG. 3C depicts a flow of data between each of these modules and their respective roles in communicating with an external 3D modeling application 346 in time-sequenced stages "A" to "E," respectively. At stage A, input is received by the human input recognition and processing module 323. The input may, for instance, include user input provided to the human recognition and processing module 323 by the hardware abstraction layer 312. The human recognition and processing module 323 may also convert the received input into a different format, such as that which conforms to BVH. In some examples, the human recognition and processing module 323 may determine what type of gesture the user has performed. For instance, the human recognition and processing module 323 may determine that the input received from hardware abstraction layer 312 indicates that the user has performed a pinching gesture.

One or more pattern recognition or signal processing techniques may be carried out to interpret the received input. The human recognition and processing module 323 may, for instance, access one or more data sets, such as a motion corpora database, when performing this determination. For example, the human recognition and processing module 323 may evaluate the received input against multiple different predetermined gestures indicated by data stored in the motion corpora database. In some implementations, the human recognition and processing module 323 may evaluate the received input against gestures indicated by user-defined gestures indicated by one or more data sets. Such user-defined gestures may include one or more custom gestures that the user has created and stored in association with one or more desired actions or adjustments.

One or more signal conditioning processes may also be carried out in stage A to attenuate noise and other anomalies in the received input. For example, the received input or a portion thereof may be subject to Kalman filtering or double exponential smoothing prior to or in parallel with the gesture determination processes described above. Such processes may serve to improve gesture recognition accuracy. Upon determining the gesture performed by the user, the human input recognition and processing module 323 may provide or publish indication of the determined gesture to the message bus, which may make the indication of the determined gesture accessible to other modules to which it is communicatively coupled.

At stage B, which includes sub-stages $B_1$ and $B_2$, an action is determined based on the determined gesture or movement information. This action may, for instance, include an adjustment to be applied to the 3D workspace being rendered to the user by the 3D modeling application to effect change in one or more assets or entities within the workspace. At this stage, one or more lookups are performed by the asset management and inventory module 325 based on the indication of the determined gesture, or movement information to determine which of the rendered assets or entities the gesture was directed toward. In other words, the interaction and control subsystem 322 may determine which asset or object within the rendered workspace with which the user is attempting to interact or the context of the user's gesture. This may be performed by comparing the location at which the user performed the determined gesture (e.g., within their surrounding environment) and evaluating the coordinates of this location against coordinates of each asset or object included within the workspace being rendered by the 3D modeling application. The interaction and control subsystem 322 may derive the location at which the user performed the determined gesture from the data it receives from the hardware abstraction layer 312 and derive the locations of assets or entities within the workspace being rendered by the 3D modeling application from the data it receives from the application interface 332.

Upon determining both the gesture performed by the user and the asset or object that the determined gesture is directed toward, the interaction and control subsystem 322 may determine a particular action or adjustment to apply to the workspace. The multiple different predetermined gestures, as described above, may each correspond to multiple different predetermined actions, respectively. In an example in which the user performs a pinching gesture, the interaction and control subsystem 322 may determine that the user is attempting to grab or handle a particular asset or object within the rendered workspace. In another example in which the user performs a gesture that involves a twist of the wrist, the interaction and control subsystem 322 may determine that the user is attempting to spin or rotate a particular asset or object within the rendered workspace about its central axis. In yet another example in which the user performs a gesture that involves a pushing motion, the interaction and control subsystem 322 may determine that the user is attempting to apply a linear force to a particular asset or object, which may result in an equal and opposite reaction to the linear force that includes the particular asset or object being translated or displaced within the workspace. Various characteristics of the determined gesture may act to define the action performed. The middleware 112 may determine one or more characteristics associated with the movement of the user's body parts including mass, forces (e.g., magnitude and direction), moments of inertia, coefficients of friction, momentum, velocity, acceleration, and the like. In addition, various characteristics of the particular asset or object may be obtained and/or derived (e.g., shape, textures, locations, weight, volume, density, center of gravity, electromagnetic properties, aerodynamic properties, etc.). This information may also be utilized in action determination processes.

In addition to determining which asset or object to which to apply the action corresponding to the determined gesture, the interaction and control subsystem 322 may also determine which portions or regions of a particular asset or object to which to apply the action. In this way, user interaction with assets or entities within the rendered workspace may be highly localized. In the example in which the user performs a gesture that involves a pushing motion, the interaction and control subsystem 322 may, for instance, determine that the user is attempting to apply a linear force to an off-center portion of a particular asset or object. With this degree of localization, the user's gesture may result in an equal and opposite reaction to the linear force that includes the particular asset or object not only being translated within the workspace, but also rotating throughout its translation. It is to be understood that the actions or adjustments determined by the interaction and control subsystem 322 may encompass some or all of the data necessary to simulate physical reactions to the user's gestures. In another example, the interaction and control subsystem 332 may, for instance, obtain data that a drone is flying at a particular height and at a particular speed referenced to portions or regions of a modeled drone in the workspace. With this particular height and particular speed, the interaction and control subsystem 332 may apply a movement to the modeled drone in the workspace translated from the particular height and particular speed obtained from the data. In this way, the middleware 112 can be seen as augmenting the 3D modeling application with a physics engine.

The interaction and control subsystem 322 may map the determined action or adjustment to functions native to the 3D modeling application. The interaction and control subsystem 322 may maintain a list of different functions that (i) are supported by the 3D modeling application and (ii) each, when executed by the 3D modeling application, apply a respective adjustment to the workspace. Such native functions may, for instance, include extrude, translate, union, subtract, stretch, explode, create, delete, fillet, group, join, and the like. The interaction and control subsystem 322 may determine which particular combination of these functions, when executed by the 3D modeling application, apply the determined action or adjustment to the 3D workspace being rendered. That is, the middleware 112 is able to simulate complex physical reactions within a rendered workspace by instructing the 3D modeling application to execute combinations and/or series of specific functions that are native to the 3D modeling application, which may be otherwise incapable of providing such types of simulations.

Figure 4:
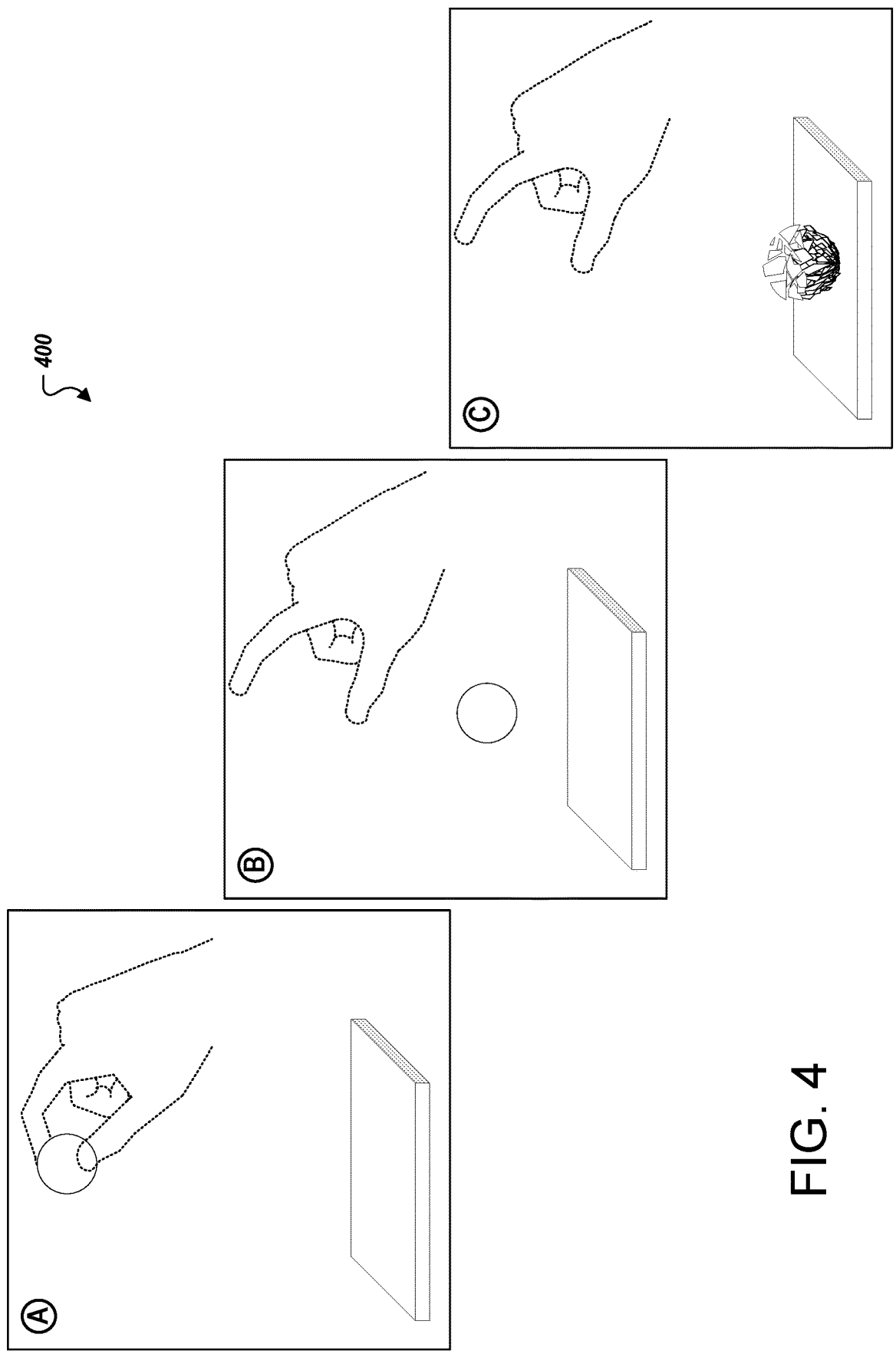
FIGS. 4 and 5 are exemplary renderings of a spatially aware workspaces as output by a spatially aware application based on natural user input received at middleware 112.

As demonstrated in example 400 illustrated in FIG. 4, middleware 112 may, for example, cause an object within the workspace to "shatter" by instructing the spatially aware application, such as the 3D modeling application, to concurrently (i) delete a particular object and (ii) create several entities that are smaller than the particular object. Following the deletion of the particular object and creation of new entities, the middleware 112 may cause the new entities to disperse (e.g., translate) outward from the location within the workspace at which the particular object "shattered" at rates and in directions dependent upon characteristics of the gesture and each object. Collectively, this process may simulate the particular object shattering and its shards of the particular object that are sent flying as a result of the shattering event. The interaction and control subsystem 322 may also invoke functions simulating gravity such that the shards rest at new locations after splintering off from the location of the shattering event.

Figure 5:
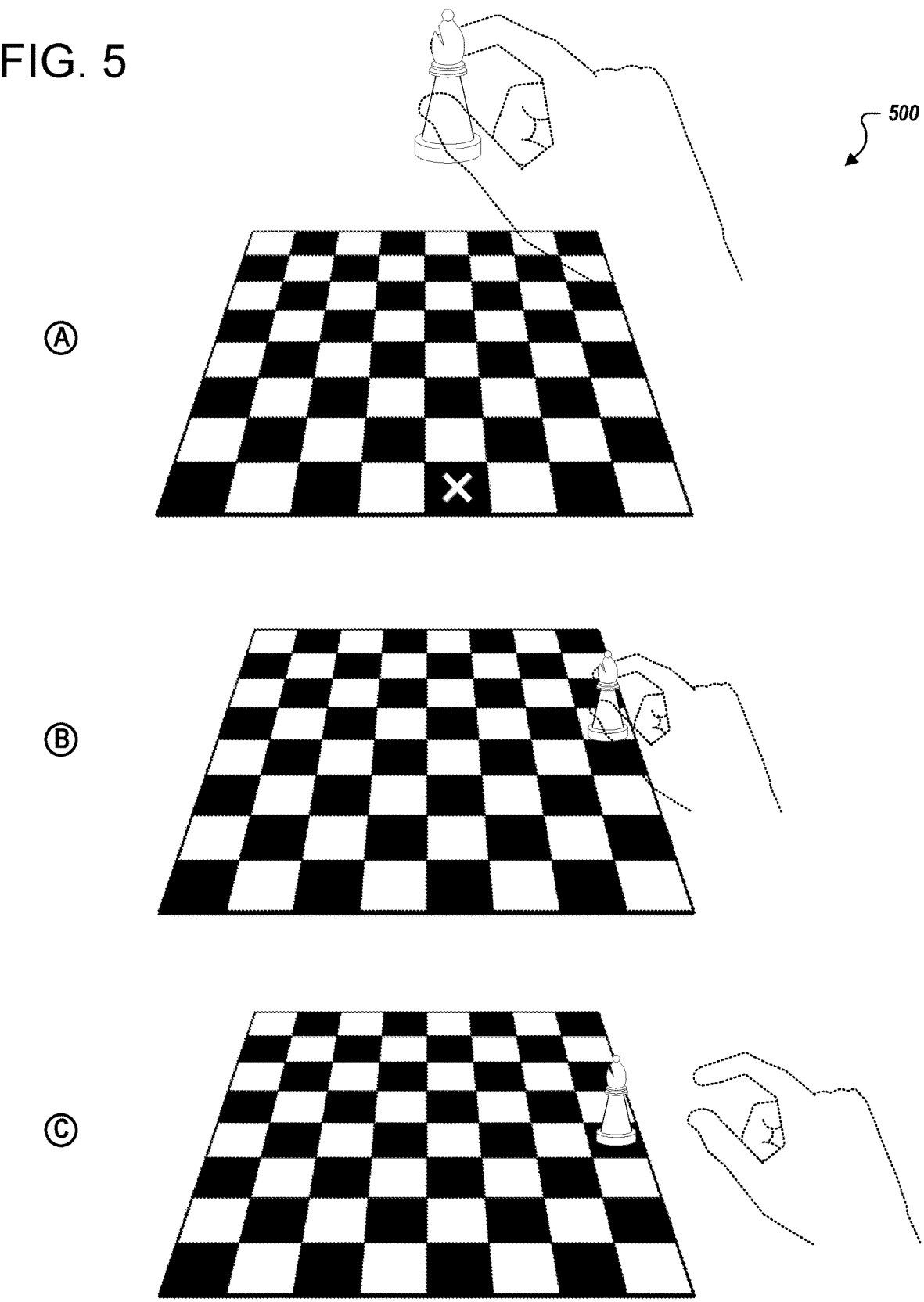

In another example 500 illustrated in FIG. 5, the middleware 112 may impose one or more other types of rules and constraints. In this example, middleware 112 may be used with a 3D chess board as a front end, and impose one or more rules and constraints to the chess board into a chess game. For example, physical constraints may be defined for use with a chess board so as to only each chess piece to be moved to locations on the chess board in adherence with conventional chess rules. A user may, for example, attempt to move a "bishop" chess piece from a particular position on the chess board, as denoted with a cross symbol at stage A of FIG. 5, to a white position on the chess board at stage B. Since the "bishop" chess piece are only allowed to move diagonally along a chess board, as shown at stage C, the middleware 112 may leverage one or more rules and constraints and take corrective measure to move the "bishop" piece onto the nearest permitted position of the chess board.

In this way, the middleware 112 is able to breathe life into environments being rendered by relatively basic 3D modeling applications. In addition, the interaction and control subsystem 322 may determine values of one or more parameters that define each function included in the particular combination of functions that it has selected. In some implementations, the sequence execution and action scheduling module 327 may communicate with a physics engine. The interaction and control subsystem 322 may utilize data obtained from the physics engine for determining actions or adjustments. The constraints and orchestration modules 324 may serve to filter data provided by the physics engine such that interaction and control subsystem 322 may selectively and intelligently enforce physical rules in the 3D workspace.

In some examples, the interaction and control subsystem 322 maps the determined action or adjustment to a single one of the multiple different functions that it maintains. In other examples, the interaction and control subsystem 322 maps the determined action or adjustment to multiple different functions that are to be executed substantially simultaneously, sequentially, or a combination thereof. At stage C, the command issuance and control interface 326 may call the one or more determined functions in plugin 328. In some implementations, the plugin 328 serves to generate a set of instructions based on the one or more determined functions and a context of the obtained determined action. The plugin 328 may format these instructions so that they are compliant with the external 3D modeling application 346. Through the plugin 328, the middleware 112 may thus provide the external 3D modeling application 346 with instruction to execute the one or more determined functions.

Once the external 3D modeling application 346 has executed the one or more determined functions at stage D and thus, applied the determined action or adjustment to its 3D workspace, the interaction and control subsystem 322 may, obtain feedback that indicates the changes made in the 3D workspace through the application interface 332. This data may be provided to the message bus so that it is visible to all of the modules included in the interaction and control subsystem 322. In other words, these operations may allow the interaction and control subsystem 322 to keep track of what is going on in the workspace that is being rendered. In some implementations, the interaction and control subsystem 322 may continuously determine and invoke functions in order to provide a physical simulation that takes place over a period of time. The interaction and control subsystem 322 may utilize such feedback to determine the next set of functions and parameters values to be applied to the 3D workspace. At stage E, the application interface 332 may provide data indicating that the determined functions passed onto the external 3D modeling application 346 have been executed. In some examples, the interaction and control subsystem 322 may enter a holding pattern upon receiving data indicating that the determined functions passed onto the external 3D modeling application 346 have been executed. In these examples, the interaction and control subsystem 322 may continue in such a holding pattern until the human input recognition and processing module 323 receives data from the hardware abstraction layer 312 that is reflective of another user movement.

In one aspect, each component included in systems 300A-C may be implemented using, for example, one or more general-purpose computers capable of responding to and executing instructions in a defined manner, personal computers, special-purpose computers, workstations, servers, or mobile devices. The components included in systems 300A-C may also communicate over one or more networks, such as those described above in association with systems 100A-C, to exchange data with one another and/or other computing devices. In addition, the components described in association with systems 300A-C may rely upon one or more remotely-located devices such as servers, databases, and/or cloud computing devices to perform at least a portion of their respective functions as described herein. In this way, systems 300A-C may enable multiple remotely-located users to collaborate on modeling projects, participate in multiplayer games, and the like.

FIG. 6 illustrates an example process 600 for controlling a 3D modeling application based on gesture input received at middleware. The operations of process 600 are described generally as being performed by systems 100A-C, 200, 300A, 300B, and 300C. In some implementations, operations of the process 400 may be performed by one or more processors included in one or more electronic devices. More specifically, the operations of process 600 may be performed by middleware 112 described above.

The middleware 112 receives data indicating that an application is rendering one or more entities at one or more corresponding locations within an environment context (602). This data may, for instance, be obtained by the application interface 332 and provided to the interface and control subsystem 322. As described above, such data may be stored by the asset management and inventory module 325, which the constraints and orchestration module 324 may query in order to determine which assets or entities the user is attempting to interact with by their coordinates within the rendered workspace.

The middleware 112 obtains natural user inputs that are generated while the application is rendering the environment context to a user (604). In some examples, the multiple natural user inputs may be generated based on one or more characteristics of the environment of the user, such as those detected and captured by NUI devices 120C. These natural user inputs may, for instance, be obtained by the hardware abstraction layer 312 and provided to the interface and control subsystem 322. In some implementations, the natural user interface may be separate from the computing device. In some examples, these natural user inputs may originate from an NUI, such as one or more of NUI devices 120C, a Microsoft Kinect, Leap Motion Controller, or any other sensing device that outputs skeletal and motion data. As described above, such data may be utilized by the human input recognition and processing module 323. Such data may, in some examples, be descriptive of movements made by the user within an environment of the user, encode one or more utterances spoken by the user, indicate electrophysiological activity of the user, such as brain activity, or descriptive of characteristics associated with a particular device, such as speed and altitude of a drone.

In some examples, the middleware 112 determines that the multiple natural user inputs show the user performing a particular gesture that involves user movement at one or more locations within the environment of the user. This operation may, for instance, be similar to that which has been described above in reference to motion recognition processes performed by the human input recognition and processing module 323. The particular gesture that is determined may be one that middleware 112 has selected from among multiple different predetermined gestures. In some implementations, the particular gesture that is determined is combination of gestures that the middleware 112 has selected from among multiple different predetermined gestures. As described above, the particular gesture may, for example, be a pinching gesture, a wrist-twisting gesture, or a pushing gesture. In some implementations, the particular gesture may be a custom gesture that the user has created and stored in association with a particular action or adjustment. One or more characteristics of the user's gesture, such as those which have been described above, may also be determined and considered by middleware 112. In other examples, the middleware 112 determines that the multiple user inputs represent a particular set of spoken terms or that the multiple user inputs represent particular electrophysiological activity. In other examples, the middleware 112 determines that the multiple user inputs represent data obtained from one or more sensory devices that represent characteristics of the sensory devices, such as GPS data, LIDAR data, and altimeter data, to name a few examples.

The middleware 112 determines an adjustment to apply to the environment context based at least on the multiple user inputs and the one or more locations (606). This operation may, for instance, be similar to that which has been described above in reference to operations of stage B. In some examples, the middleware 112 may determine which generic action is associated with the determined gesture and further determine the specific dynamics of the action as it applies to a particular asset/object or particular portion thereof. The middleware 112 may also take data provided by a physics engine and/or data indicating one or more physical characteristics of the user's gesture into account when making this determination. The determined action/adjustment may correspond to a physical reaction to take place in the workspace in response to the user's gesture.

The middleware 112 selects, based on the particular adjustment and from among multiple functions (i) that are executable by the application and (ii) that each, when executed by the application, apply a respective adjustment to the environment context, a particular set of one or more of the multiple functions (608). This operation may, for instance, be similar to that which has been described above in reference to action-to-function mapping performed by middleware 112. The functions that the middleware 112 selects from may be those that are specifically supported by the environment context application and may be accessed by the application interface 332.

The middleware 112 sends data instructing the application to execute the selected set of functions (610). This operation may, for instance, be similar to that which has been described above in reference to stages C and D. Upon outputting these instructions through the application interface 332, the environment context application may execute the particular set of one or more of the multiple functions and thus invoke the determined action/adjustment. The middleware 112 may subsequently track the state of the application's workspace through the application interface 332 and, in some examples, utilize data regarding the state of the application's workspace as feedback for determining additional actions/adjustments and functions.

In some implementations, process 600 may further include determining that the multiple natural user inputs show the user performing a particular gesture that (i) corresponds to a particular set of one or more actions and (ii) involves user movement at a particular set of one or more locations within the environment of the user that correspond to a particular set of one or more locations within the environment context at which a particular set of one or more corresponding entities are rendered. In such implementations, the set of one or more of the multiple functions that is selected may, when executed by the application, apply the particular set of one or more actions to the particular set of one or more entities that are rendered at the particular set of one or more corresponding locations within the environment context.

In some examples, process 600 may further include accessing a set of rules that control behavior of the environment context and evaluating the multiple user inputs and the one or more locations within the environment context at which one or more corresponding entities are rendered against the set of rules. This may, for instance, correspond to middleware 112 accessing rules or constraints that are managed by a rules engine. In such examples, the adjustment to apply to the environment context may be determined based at least on evaluating the multiple user inputs and the one or more locations within the environment context at which one or more corresponding entities are rendered against the set of rules. In addition, the set of rules may be stored and maintained independent of the application. In some instances, the set of rules may function augment the environment context with one or more physics systems in a manner similar to that which has been described above in association with FIGS. 4-5. In such instances, the adjustment to apply to the environment context may comply with the one or more physics systems.

In some implementations, process 600 may further include receiving data indicating other natural user inputs (i) while the application is rendering the environment context to the user and (ii) based on one or more characteristics of another, different environment of one or more other users. This may, for instance, correspond to middleware 112 receiving natural user input over a network, through Web Sockets, and the like, to enable multi-user collaboration. In such implementations, the adjustment to apply to the environment context may be determined based at least on (i) the multiple user inputs, (ii) the data indicating other natural user inputs, and (iii) the one or more locations within the environment context at which one or more corresponding entities are rendered. In this way, input provided by remotely-located users may be taken into account when determining adjustments for the environment context.

Figure 7:
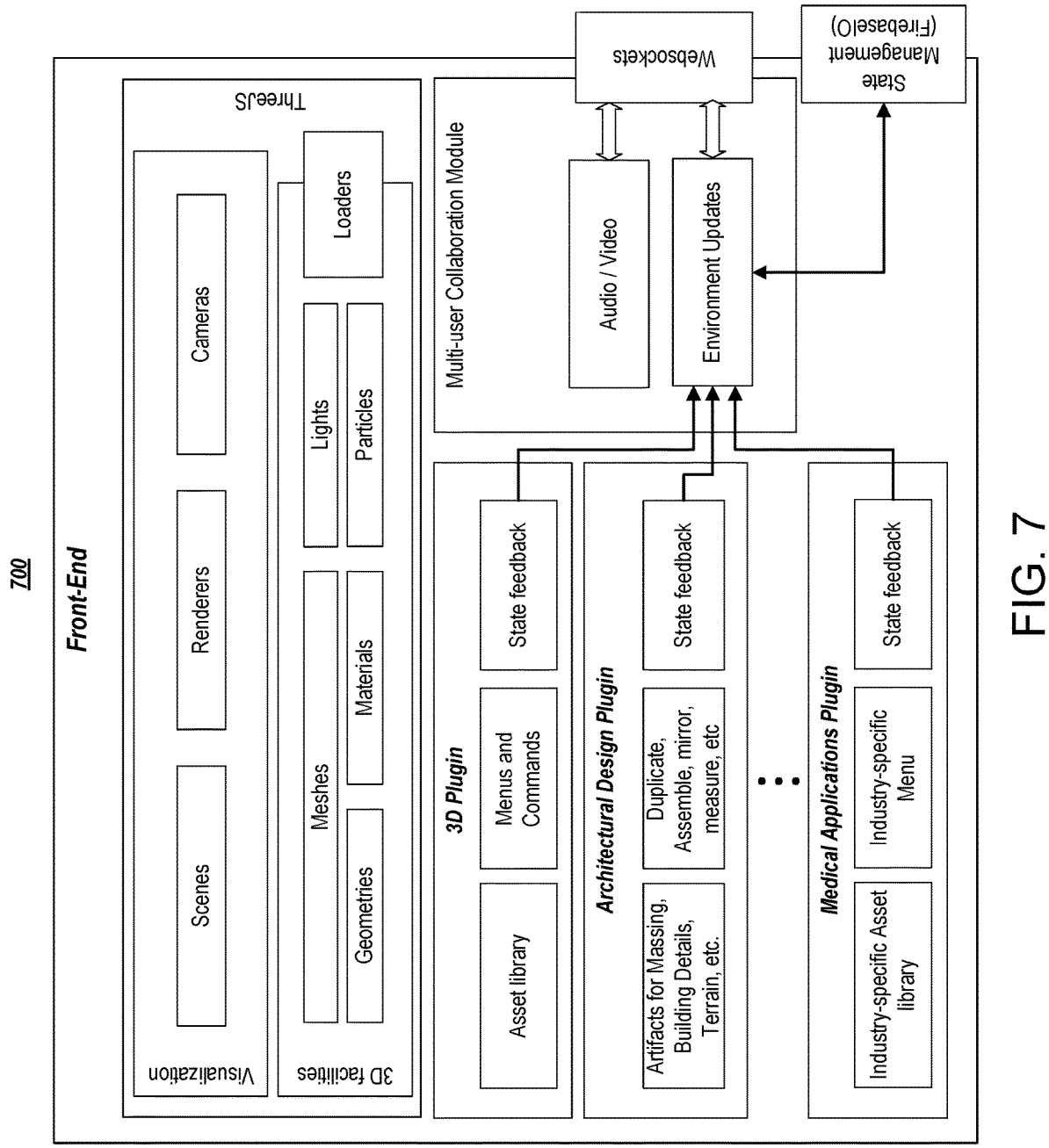

FIG. 7 illustrates a front-end system 700 that may be utilized with included in any of systems 100A-400 for controlling a 3D modeling application based on natural user input received at middleware 112. The front-end system 700 may include a lightweight/browser-based 3D design and rendering tool that allows for collaboration and customization and specialization for industries (e.g., architectural, medical, electrical, mechanical, etc.).

In addition, the front-end system 700 may be built on an open and extensible architecture that allows for plugins to customize multiple different aspects of the user interface. In addition, the front-end includes built-in multi-user collaboration facilities to allow users to work side-by-side. The front-end system 700 may leverage a library/API that uses WebGL and the like, such as 'Three.js,' to create and display graphics associated with a gesture interface as well as renderings of the 3D workspace.

Figure 8:
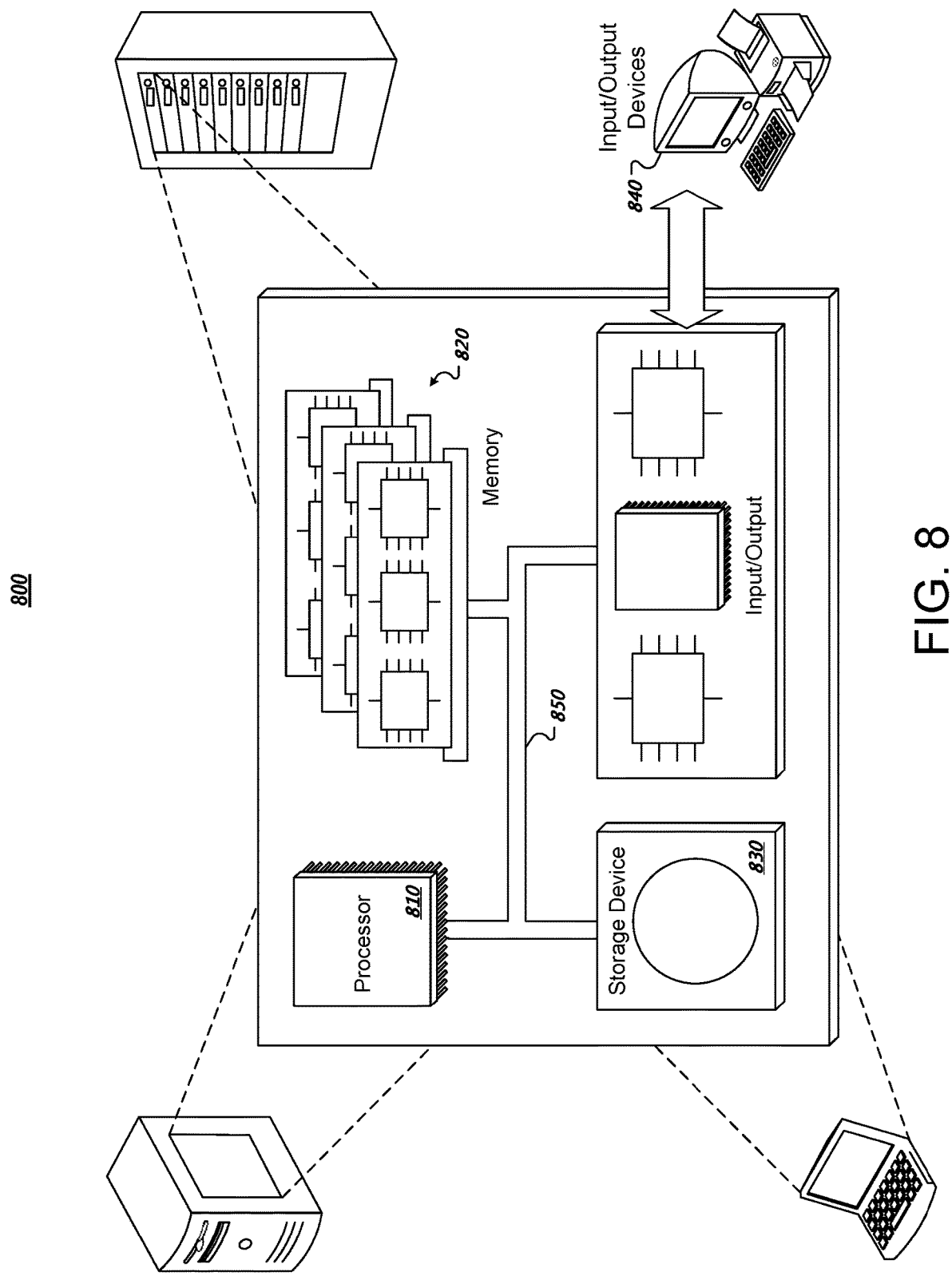

FIG. 8 is a schematic diagram of an example of a generic computer system 800. The system 800 can be used for the operations described in association with the processes described in reference to systems 300A-C and processes 600 according to some implementations. The system 800 may be included in the systems 100A-500.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, a tape device, a solid-state drive ("SSD"), a flash drive, a Secure Digital ("SD") card, or cloud-based storage.

The input/output device 840 provides input/output operations for the system 800. In one implementation, the input/output device 840 includes a keyboard and/or pointing device. In another implementation, the input/output device 840 includes a display unit for displaying graphical user interfaces. In some implementations, the input/output device 840 may take the form of one or more devices including client devices, natural user interface devices, sensors, drones and other robots, 3D printers, and the like.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits). In other implementations, a computer can be connected to cloud-based stored media. For example, cloud-based storage media such as JSON or clustering databases.

To provide for interaction with a user, the features can be implemented on a computer having a display device such as a CRT (cathode ray tube) or LCD (liquid crystal display) monitor for displaying information to the user and a keyboard (e.g., virtual and physical keyboards) and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

Figure 9:
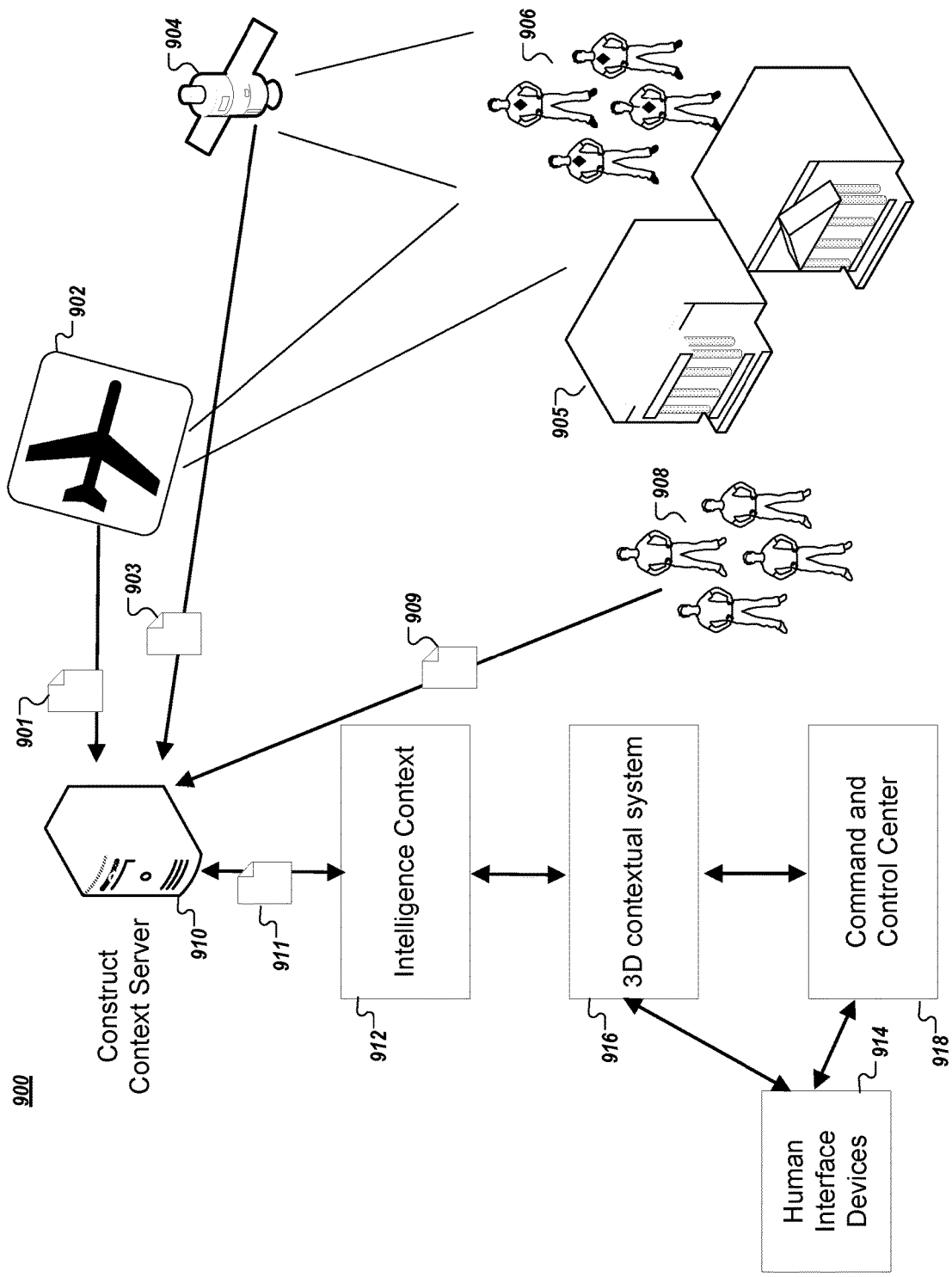
FIG. 9 is an exemplary system used in a battle theatre scenario.

FIG. 9 illustrates an exemplary embodiment of a battle theater scenario 900. Generally, FIG. 9 illustrates one use case for managing the transactions of messages and data between participating spatially aware and spatially dependent systems managed by the middleware through the establish of an operational context. In this use case, the middleware manages a 3D space derived from aggregated data from the participating systems in a battle theater scenario 900. In particular, the battle theater scenario 900 illustrates controlling a 3D application based on input received at a 3D contextual system 916. In some implementations, the middleware can manages multiple 3D applications from multiple 3D contextual systems. The 3D contextual system 916 includes exemplary framework, such as systems 300A, 300B, and 300C as illustrated in FIGS. 3A, 3B, and 3C, respectively, including middleware 112, for controlling the 3D modeling application based on received input. The battle theater scenario 900 includes a aircraft 902, a satellite 904, enemy soldiers 906, allied soldiers 908, construct contextual server 910, intelligence context 912, human interface devices 914, 3D contextual system 916, and command and control center 918. The construct contextual server 910 may include one or more servers connected locally or over a network.

In the battle theater scenario 900, the allied soldiers 908 may be unaware of a location of the enemy soldiers 906. One or more buildings 905 may block the location of the enemy soldiers 906 from the field of view of the allied soldiers 908. However, the 3D contextual system 916 and the other components of the battle theater scenario 900 can be used to inform the allied soldiers 908 of the location of the enemy soldiers 906.

In particular, the plane 902 may include a GPS receiver and an altimeter that provides data 901 indicating latitude/longitude and altitude information, respectively, to a construct context server 910. Additionally, the plane 902 may include a Light Detection and Ranging (LIDAR) sensor and a Forward Looking Infrared (FLIR) sensor for monitoring a specified target, such as the enemy soldiers 906 as instructed by a particular individual, such as a General located at the command and control center 918. The plane 902's LIDAR and FLIR sensors provide unit positions/movement and heat signature data included in data 901, respectively, to the construct context server 910. The satellite 904 may include camera and sensors to provide data 903 indicating topography and weather condition information to the construct context server 910. The topography and weather condition information will be useful for displaying an environment rendered by the 3D contextual system 916 as described below. Additionally, the allied soldiers 908 provide data 909 to the construct context server 910. In particular, the allied soldiers 908 may be equipped with at least a GPS device, a compass, a helmet camera, and a microphone. The GPS device, compass, helmet camera, and microphone can relay data 909 indicating GPS coordinates, compass information, live video feed from the helmet camera, and real time voice recordings to the construct context server 910.

The construct context server 910 can aggregate the received data 901, data 903, and data 909 into contextual data 911. The contextual data 911 includes real time data feeds from each of the plane 902, the satellite 904, each of the allied soldiers 908. The construct context server 910 can timestamp and log each of the received data 901, data 903, and data 909 for further processing later. Additionally, the construct context server 910 can bi-directionally communicate with each of the plane 902, the satellite 904, and each of the allied soldiers 908. The construct context server 910 can provide the contextual data 911 to an intelligence context 912.

The intelligence context 912 may comprise one or more agencies that integrates logistical information, such as the names of each soldier in the allied soldiers 908, an area including a city and country of the enemy soldiers 906, and a mission name for the ongoing attack performed by the allied soldiers 908 with the received contextual data 911. The intelligence context 912 provides this contextual and logistical information to the 3D contextual system 916.

The 3D contextual system 916 includes middleware 112 that may be able to transform the received contextual and logistical information into a virtual environment. For example, the virtual environment of the battle grid may include a top down view or a three-dimensional view of the topography of the battle theater scenario 900 including one or more polygons representing figures in the virtual environment. The middleware 112 may use the contextual information to illustrate and characterize the topography, overlay a battle grid, and display the polygons representing the figures in the virtual environment.

A user, such as General of the allied soldiers 908, stationed at the command and control center 918, may place a virtual reality (VR) headset on his or head to view the virtual environment representing the battle theater scenario 900. In other implementations, the General of the allied soldiers 908 may not be required to place a VR headset on his or her head, but instead, interacts and collaborates with a holographic interface. The holographic interface may be in front of or surround the General. The General can interact with entities within the holographic interface in a similar manner as if the General were interacting with the environment in the VR realm. Additionally, the General may use one or more NUI devices 120C to interact with the virtual environment. The polygons in the virtual environment may represent actual figures in the battlefield. For example, a cube may represent the plane 902, a sphere may represent the satellite 904 overlooking the battlefield, each of the allied soldiers 908 may be represented as small cubes, and each of the enemy soldiers 906 may be represented as small pyramids. The various shapes can further distinguish between the different entities in the virtual environment.

The General can interact with the contextual information included in the virtual environment. For example, the General can move his or her hand towards an area of space in the virtual environment, as indicated by a hand movement from the human interface devices 914 (e.g., natural user interface devices, 6-DOF controllers, or other standard input devices) communicated from the command and control center 918, to touch a small cube that indicates a selection of a solder from the allied soldiers 908. In response to selecting a soldier, the virtual information displays a list of information on the selected solider which the General can view and interact with. For example, the list of information can include the GPS coordinates of that solder, the compass information of that soldier, the live video feed from the helmet camera of that soldier, and any real time voice messages coming from that soldier. The General can select the cube to see status information on the plane 902, such as health of the plane 902, fuel amount remaining, ammunition amount, speed of the plane 902, and altitude height of the plane 902. In addition, the General can additionally open a voice channel when selecting the cube indicating the plane 902 and communicate to the pilot of the plane 902 to move the plane 902 to a location where help is most needed. If the plane 902 is a drone, which does not require a pilot, the General can automatically instruct the drone to move to a particular latitude, longitude, and altitude, as shown in the virtual environment. However, if the drone includes a remote pilot, the General can send a message to the remote pilot instructing the remote pilot to move the drone to a particular latitude, longitude, and altitude.

In addition to selecting particular areas of space to gain information on a particular figure in the virtual environment, the General may also provide instructions to the allied solders 908. For example, the General may select a small cube indicating a particular solder and select another location on the battle grid in the virtual environment to instruct that soldier and his or her team of allied soldiers 908 to move to that other location. The soldier may receive a location on his or her GPS device from the construct context server 910 pointing to where the allied soldiers 908 should move as instructed by the General.

In addition, the virtual environment may illustrate duress signals in response to particular events occurring on the battlefield, as provided by the construct context server 910. In particular, the sensors on the drone 902, the sensors on the satellite 904, and the sensors associated with the allied soldiers 908 may provide sensory data that exceeds thresholds of normal sensory data indicating duress signals. For example, the drone 902's FLIR sensor may provide heat signature data indicating a presence of the enemy soldiers 906. The heat signature data may increase substantially in intensity as the enemy soldiers 906 fire weapons at the allied soldiers 908. The drone 902's FLIR sensor may detect the heat intensity from the fired weapons in addition to the heat intensity detected from the presence of the enemy soldiers 906 and relay the indication of varying heat intensity to the construct context server 910. The construct context server 910 may provide the indication of the varying heat intensity to the 3D contextual system 916 and indicate a warning surrounding the enemy soldiers 906 shown in the virtual environment. The General can view this heat warning around the enemy soldiers 906 and indicate the incoming fire to the allied soldiers 908. Additionally, the General can instruct the allied soldiers 908 to move to a new location by selecting a spatial location in the battle grid of the virtual environment to avoid the incoming fire.

In another example, the drone 902's FLIR sensor may detect a substantially higher heat intensity when a bomb explodes over gun fire. This increase heat intensity may present itself to the construct context server 910 and the construct context server 910 may detect this as being a bomb explosion. Additionally, should any changes occur in topography on the battlefield as a result of the bomb explosion, these topography changes will be illustrated in the virtual environment overlaid by the battle grid. For example, if a bomb explodes and crumbles building 905, the virtual environment will also show building 905 in a crumbled state.

A few major benefits exist when using a virtual environment with the 3D contextual system 916. First, the user using the virtual headset or the NUI devices 120C to communicate with the allied soldiers 908 or the airplane 902, can see real-time changes on the battlefield as they occur. Second, the user cannot be impacted by any harm because the user is located remotely from the battlefield. Third, the allied soldiers 908 can receive helpful information on the battlefield from others with a total view of the battlefield.

The 3D contextual system 916 can receive messages from the command and control center 918 to provide to the allied solders 908. The messages can push mission operatives to allied soldiers 908, provide information regarding the enemy soldiers 906, and provide other information regarding the mission. For example, the messages may describe to the allied soldiers 908 a number of the enemy soldiers 906, or the type of weapons included by the enemy soldiers 906, or whether to abort/abandon the mission.

The battle theater scenario 900 was purely provided as an illustrative example of a use case for the 3D contextual system 916. Other use cases are possible, such as driving scenarios in heavy traffic, police chases, and home security systems, to name a few examples.

What is claimed is:

1. A computer-implemented method comprising:
receiving, through an application layer interface in communication with an application layer running on a computing device, data indicating that an application operating at the application layer is interpreting spatial data about one or more entities at one or more corresponding locations within an environment context from one or more participating systems;
receiving, through an interface in communication with the one or more participating systems that provide spatial data, multiple sets of spatial data provided by or derived from the one or more participating systems that are generated while the application manages one or more interactions in the environment context;
converting, using an abstraction layer, the multiple sets of spatial data provided by or derived from the one or more participating systems into converted spatial data in a particular format, the abstraction layer being able to convert, into the particular format, spatial data sensed by multiple, different types of hardware devices in different formats and the abstraction layer being separate from the application operating at the application layer;
determining, based at least on the converted spatial data and the one or more entities at the one or more corresponding locations, an adjustment to apply to the environment context;
based on the adjustment, selecting, from among multiple functions (i) that are executable by the application and (ii) that each, when executed by the application, apply a respective adjustment to the environment context, a set of one or more of the multiple functions; and
sending, through the application interface in communication with the application layer running on the computing device, messages comprising data and instructions to the one or more participating systems to execute the set of one or more of the multiple functions.

2. The computer-implemented method of claim 1, wherein receiving, through the interface in communication with the one or more systems that provide spatial data, the multiple sets of spatial data provided by or derived from the one or more participating systems that are generated while the application manages the one or more interactions in the environment context comprises:
receiving, through the interface in communication with a spatial data provider, multiple sets of spatial data provided by or derived from the one or more participating systems that are generated while the application manages the one or more interactions in the environment context and that are descriptive of movements made by a user within the environment of the user.

3. The computer-implemented method of claim 2, further comprising:
determining that the converted spatial data (i) corresponds to a particular set of one or more actions and (ii) involves a state change of a particular set of one or more entities at one or more of corresponding locations; and
wherein based on the adjustment, selecting, from among multiple functions (i) that are executable by the application and (ii) that each, when executed by the application, apply a respective adjustment to the environment context, the set of one or more of the multiple functions comprises:
selecting, from among multiple functions (i) that are executable by the application and (ii) that each, when executed by the application, apply a respective adjustment to the environment context, a set of one or more of the multiple functions that, when executed by the application, apply the particular set of one or more actions to the particular set of one or more entities that are determined based on the spatial data derived from the environment context.

4. The computer-implemented method of claim 1, further comprising:
accessing a set of rules that control behavior of the environment context;
evaluating the converted spatial data and the one or more locations within the environment context at which the one or more corresponding entities are located against the set of rules;
wherein determining, based at least on the converted spatial data and the one or more entities at the one or more corresponding locations, the adjustment to apply to the environment context comprises:
determining, based at least on evaluating the converted spatial data and the one or more locations within the environment context at which the one or more corresponding entities are located against the set of rules, an adjustment to apply to the environment context; and
providing the adjustment to apply to the environment context to subsequent applications selected to receive the adjustment.

5. The computer-implemented method of claim 4, wherein accessing the set of rules comprises accessing a set of rules that define construction or augmentation of the environment context with one or more sensors.

6. The computer-implemented method of claim 4, wherein accessing the set of rules comprises accessing a set of rules that are stored and maintained independent of the application.

7. The computer-implemented method of claim 4, wherein accessing the set of rules comprises accessing a set of rules that construct or augment the environment context derived from spatial data provided by or derived from the one or more participating systems about an operational environment.

8. The computer-implemented method of claim 7, wherein determining, based at least on evaluating the converted spatial data and the one or more locations within the environment context at which the one or more corresponding entities are located against the set of rules, the adjustment to apply to the environment context comprises:

determining, based at least on evaluating the converted spatial data and the one or more locations within the environment context at which the one or more corresponding entities are located against the set of rules, an adjustment to apply to the environment context that complies with one or more spatial physics systems.

9. The computer-implemented method of claim 1, wherein receiving, through the interface in communication with a natural user interface device, multiple sets of spatial data comprises:

receiving, through the interface in communication with a spatial data provider that is separate from the computing device, multiple sets of spatial data provided by or derived from the one or more participating systems.

10. The computer-implemented method of claim 1, wherein receiving, through an interface in communication with a spatial data provider, multiple sets of spatial data provided by or derived from the one or more participating systems that are generated while the application manages one or more interactions in the environment context comprises:

receiving, through an interface in communication with a spatial data provider, audio data that is generated while the application manages the one or more interactions in the environment context to the user and encodes one or more utterances spoken by the user.

11. The computer-implemented method of claim 1, wherein receiving, through the interface, multiple inputs from the one or more participating systems that are generated while the application manages one or more interactions in the environment context to the user comprises:

receiving, through an interface in communication with a spatial data provider, electroencephalographic data that is generated while the application is interpreting the environment context to the user and indicates electrophysiological activity of the user.

12. The computer-implemented method of claim 1, wherein receiving, through the interface in communication with a natural user interface device, multiple inputs from the one or more participating systems that are generated while the application manages one or more interactions in the environment context to the user comprises:

receiving, through the interface in communication with a spatial data provider that monitors an environment of the user, multiple inputs that are generated (i) while the application is interpreting the environment context to the user and (ii) based on one or more characteristics of the environment of the user.

13. The computer-implemented method of claim 12, further comprising:

receiving data indicating other inputs (i) while the application is interpreting the environment context to the user and (ii) based on one or more characteristics of another, different environment of one or more other users; and wherein determining, based at least on the converted spatial data and the one or more locations within the environment context at which one or more corresponding entities are located, the adjustment to apply to the environment context comprises:

determining, based at least on (i) the converted spatial data, (ii) the data indicating other inputs, and (iii) the one or more locations within the environment context at which the one or more corresponding entities are located, the adjustment to apply to the environment context.

14. The computer-implemented method of claim 1:

wherein the abstraction layer allows usage of multiple, different types of natural user interface devices concurrently and in coordination with each other;

wherein converting, using the abstraction layer, the multiple sets of spatial data provided by or derived from the one or more participating systems into converted spatial data in the particular format comprises concurrently converting, using the abstraction layer, spatial data from the multiple, different types of natural user interface devices into converted spatial data in the particular format; and wherein determining, based at least on the converted spatial data and the one or more entities at the one or more corresponding locations, the adjustment to apply to the environment context comprises determining, based at least on the converted spatial data and the one or more entities at the one or more corresponding locations, an adjustment to apply to the environment context that accounts for coordinated natural user input received concurrently from the multiple, different types of natural user interface devices.

15. The computer-implemented method of claim 1, wherein the environment context is a three-dimensional (3D) workspace and the application operating at the application layer is a third party 3D modeling application, the method further comprising:

imposing, by middleware, constraints upon the 3D workspace maintained by the third party 3D modeling application to transform a user experience provided by the third party 3D modeling application into one of the middleware's own specifications, wherein the middleware is separate from the third party 3D modeling application.

16. The computer-implemented method of claim 1, further comprising:

specifying, by a constraints and orchestration module, types of events and actions that are capable of occurring within the environment context based on the one or more entities at the one or more corresponding locations in the environment context; and specifying, by the constraints and orchestration module, commands that are made available to the user by the application based on the converted spatial data, wherein the constraints and orchestration module is part of middleware that is separate from the application operating at the application layer.

17. A computer program product, encoded on one or more non-transitory computer storage media, comprising instructions that when executed by one or more computers cause the one or more computers to perform operations comprising:

receiving, through an application interface in communication with an application layer running on a computing device, data indicating that an application operating at the application layer is rendering one or more entities at one or more corresponding locations within an environment context from one or more participating systems;

receiving, through an interface in communication with a spatial data provider, multiple sets of spatial data provided by or derived from the one or more participating systems that are generated while the application manages one or more interactions in the environment context;

converting, using an abstraction layer, the multiple sets of spatial data provided by or derived from the one or more participating systems into converted spatial data in a particular format, the abstraction layer being able to convert, into the particular format, spatial data sensed by multiple, different types of hardware devices in different formats and the abstraction layer being separate from the application operating at the application layer;

determining, based at least on the converted spatial data and the one or more entities at the one or more corresponding locations, an adjustment to apply to the environment context;

based on the adjustment, selecting, from among multiple functions (i) that are executable by the application and (ii) that each, when executed by the application, apply a respective adjustment to the environment context, a set of one or more of the multiple functions; and sending, through the application interface in communication with the application layer running on the computing device, messages comprising data and instructions to the one or more participating systems to execute the set of one or more of the multiple functions.

18. A data processing apparatus comprising:

a computer-readable storage device having stored thereon instructions that, when executed by the one or more data processing apparatus, cause the one or more data processing apparatus to perform operations comprising:

receiving, through an application interface in communication with an application layer running on a computing device, data indicating that an application operating at the application layer is rendering one or more entities at one or more corresponding locations within an environment context from one or more participating systems;

receiving, through an interface in communication with a spatial data provider, multiple sets of spatial data provided by or derived from the one or more participating systems that are generated while the application manages one or more interactions in the environment context;

converting, using an abstraction layer, the multiple sets of spatial data provided by or derived from the one or more participating systems into converted spatial data in a particular format, the abstraction layer being able to convert, into the particular format, spatial data sensed by multiple, different types of hardware devices in different formats and the abstraction layer being separate from the application operating at the application layer;

determining, based at least on the converted spatial data and the one or more entities at the one or more corresponding locations, an adjustment to apply to the environment context;

based on the adjustment, selecting, from among multiple functions (i) that are executable by the application and (ii) that each, when executed by the application, apply a respective adjustment to the environment context, a set of one or more of the multiple functions; and sending, through the application interface in communication with the application layer running on the computing device, messages comprising data and instructions to the one or more participating systems to execute the set of one or more of the multiple functions.

19. The system of claim 18, wherein the operations further comprise:

accessing a set of rules that control behavior of the environment context;

evaluating the converted spatial data and the one or more locations within the environment context at which the one or more corresponding entities are located against the set of rules;

wherein determining, based at least on the converted spatial data and the one or more entities at the one or more corresponding locations, the adjustment to apply to the environment context comprises:

determining, based at least on evaluating the multiple sets of spatial data provided by or derived from the one or more participating systems and the one or more locations within the environment context at which the one or more corresponding entities are located against the set of rules, an adjustment to apply to the environment context; and providing the adjustment to apply to the environment context to subsequent applications selected to receive the adjustment.

20. The system of claim 19, wherein the environment context comprises one or more other physical environments in an operational context constructed from the spatial data from the one or more participating systems.

* * * * *